(12) United States Patent
Hayakawa et al.

(10) Patent No.: US 8,036,447 B2
(45) Date of Patent: Oct. 11, 2011

(54) INSPECTION APPARATUS FOR INSPECTING PATTERNS OF A SUBSTRATE

(75) Inventors: Koichi Hayakawa, Hitachinaka (JP); Hiroshi Miyai, Hitachi (JP); Masaaki Nojiri, Hitachinaka (JP); Michio Nakano, Hitachinaka (JP); Takako Fujisawa, Tokai (JP); Dai Fujii, Tokai (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/564,567

(22) Filed: Sep. 22, 2009

(65) Prior Publication Data

US 2010/0008564 A1    Jan. 14, 2010

Related U.S. Application Data

(62) Division of application No. 11/344,101, filed on Feb. 1, 2006, now abandoned.

(30) Foreign Application Priority Data

Feb. 1, 2005   (JP) ................... 2005-025480
Mar. 10, 2005  (JP) ................... 2005-067664
Aug. 31, 2005  (JP) ................... 2005-251237

(51) Int. Cl.
*G06K 9/00* (2006.01)
(52) U.S. Cl. ......... 382/145; 382/141; 382/149; 382/151
(58) Field of Classification Search ................. 382/141, 382/145, 149, 150, 151
See application file for complete search history.

(56) References Cited

U.S. PATENT DOCUMENTS

| | | | |
|---|---|---|---|
| 5,038,048 A | 8/1991 | Maeda et al. | |
| 5,146,509 A | 9/1992 | Hara et al. | |
| 5,475,766 A | 12/1995 | Tsuchiya et al. | |
| 5,502,306 A | 3/1996 | Meisburger et al. | |
| 5,986,263 A | 11/1999 | Hiroi et al. | |
| 6,493,082 B2 | 12/2002 | Nara et al. | |
| 6,512,843 B1 * | 1/2003 | Kuwabara | 382/149 |

(Continued)

FOREIGN PATENT DOCUMENTS

JP    59-155941 A    9/1984

(Continued)

OTHER PUBLICATIONS

Japanese Office Action issued in Japanese Patent Application No. JP 2005-251237 dated Apr. 6, 2010.

(Continued)

*Primary Examiner* — Matthew C Bella
*Assistant Examiner* — Eric Rush
(74) *Attorney, Agent, or Firm* — McDermott Will & Emery LLP

(57) ABSTRACT

A pattern inspection apparatus has a setting unit of a plurality of cell areas A and B of different cell comparison pitches and inspects the plurality of cell areas of the different cell comparison pitches in accordance with settings of the setting unit. As information to read out image data for an inspection image and a reference image from an image memory, in addition to position information of a defective image, identification information showing either a cell comparison or a die comparison and relative position information of the reference image can be set. The apparatus also has a unit for setting a plurality of inspection threshold values every inspection area and inspects a plurality of inspection areas by the plurality of inspection threshold values.

3 Claims, 28 Drawing Sheets

U.S. PATENT DOCUMENTS

| | | | |
|---|---|---|---|
| 6,519,357 B2* | 2/2003 | Takeuchi | 382/149 |
| 6,973,208 B2 | 12/2005 | Kuwabara | |
| 7,113,629 B2* | 9/2006 | Onishi | 382/149 |
| 7,223,975 B2 | 5/2007 | Nara et al. | |
| 7,292,327 B2 | 11/2007 | Nara et al. | |
| 7,366,343 B2* | 4/2008 | Takeuchi | 382/145 |
| 7,421,109 B2 | 9/2008 | Tsuchiya et al. | |
| 2001/0048761 A1* | 12/2001 | Hamamatsu et al. | 382/149 |
| 2002/0051565 A1* | 5/2002 | Hiroi et al. | 382/149 |
| 2002/0094120 A1* | 7/2002 | Hiroi et al. | 382/149 |
| 2004/0227079 A1 | 11/2004 | Nara et al. | |
| 2006/0280358 A1* | 12/2006 | Ishikawa | 382/149 |

FOREIGN PATENT DOCUMENTS

| | | |
|---|---|---|
| JP | 59-160548 A | 9/1984 |
| JP | 61-82107 A | 4/1986 |
| JP | 61-193052 | 8/1986 |
| JP | 2-15546 A | 1/1990 |
| JP | 02-210249 | 8/1990 |
| JP | 3-85742 | 4/1991 |
| JP | 3-102846 | 4/1991 |
| JP | 3-167456 A | 7/1991 |
| JP | 3-177040 | 8/1991 |
| JP | 4-279041 | 10/1992 |
| JP | 05-198641 | 8/1993 |
| JP | 5-258703 A | 10/1993 |
| JP | 6-58220 B2 | 8/1994 |
| JP | 6-338280 A | 12/1994 |
| JP | 9-89794 A | 4/1997 |
| JP | 9-320505 | 12/1997 |
| JP | 11-281585 | 10/1999 |
| JP | 2002-342757 | 11/2002 |
| JP | 2003-059989 | 2/2003 |
| JP | 2003-59989 | 2/2003 |
| JP | 2004-077390 | 3/2004 |
| JP | 2004-132950 | 4/2004 |
| JP | 2004-177139 | 6/2004 |
| JP | 2004-340650 | 12/2004 |
| JP | 2005-044912 | 2/2005 |

OTHER PUBLICATIONS

Japanese Office Action, issued in Japanese Patent Application No. 2005-067664, drafted on Jun. 15, 2009.

Japanese Office Action, issued in Japanese Patent Application No. 2005-025480, mailed Nov. 11, 2008.

P. Sandland et al., "An Electron-beam Inspection System for X-ray Mask Production", Journal of Vacuum Science & Technology B, vol. 9, No. 6, 1991, pp. 3005-3009.

D. Fleming et al., "Prospects for X-ray Lithography", Journal of Vacuum Science & Technology B, vol. 10, No. 6, 1992, pp. 2511-2515.

W. D. Meisburger et al., "Low-voltage Electron-optical System for the High-Speed Inspection of Integrated Circuits", Journal of Vacuum Science and Technology B, vol. 10, No. 6, 1992, pp. 2804-2805.

Meisburger, W., "Requirements and performance of an electron-beam column designed for x-ray mask inspection", J. Vac. Sci. Technol. B, Nov./Dec. 1991, vol. 9, No. 6, pp. 3010-3014.

Japanese Office Action issued in Japanese Patent Application No. JP 2005-025480 dated on Nov. 11, 2008.

* cited by examiner

INSPECTION STRIPE

IMAGE 2
IMAGE 1

INSPECTION STRIPE

FIG.23

| CONTENTS IN THE MEMORY TABLE A |
|---|
| EXTRACTED INFORMATION OF DEFECT NO.1 |
| EXTRACTED INFORMATION OF DEFECT NO.2 |
| EXTRACTED INFORMATION OF DEFECT NO.3 |
| . . . |
| EXTRACTED INFORMATION OF DEFECT NO.n |

| CONTENTS IN THE MEMORY TABLE B |
|---|
| EXTRACTED INFORMATION OF DEFECT NO.n+1 |
| EXTRACTED INFORMATION OF DEFECT NO.n+2 |
| EXTRACTED INFORMATION OF DEFECT NO.n+3 |
| . . . |
| EXTRACTED INFORMATION OF DEFECT NO.2n |

FIG.26A
FIG.26B
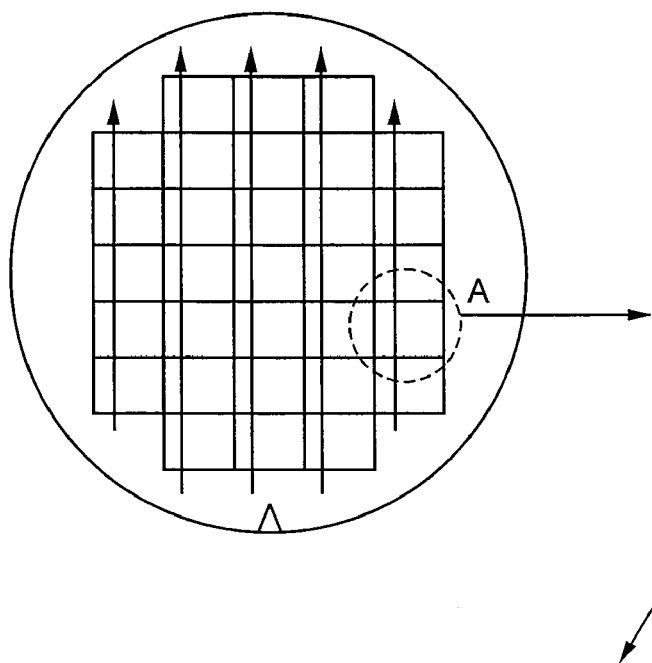
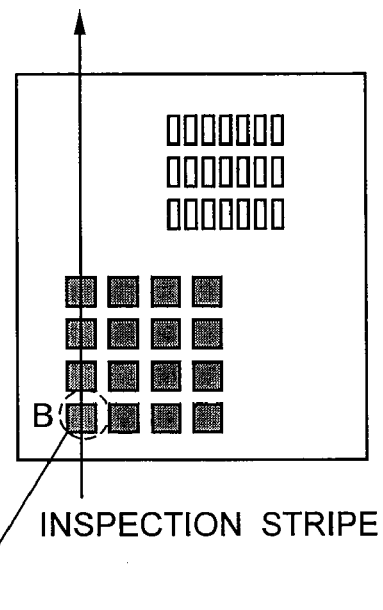
INSPECTION STRIPE
FIG.26C
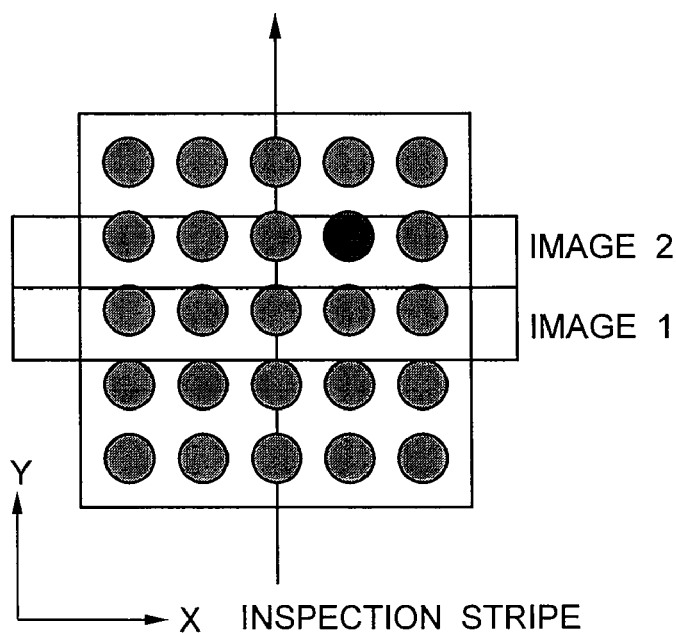
IMAGE 2
IMAGE 1
X INSPECTION STRIPE

▓ INSPECTION AREA A INSPECTION THRESHOLD VALUE 1

▒ INSPECTION AREA B INSPECTION THRESHOLD VALUE 2

☐ INSPECTION AREA C INSPECTION THRESHOLD VALUE 3

INSPECTION APPARATUS FOR INSPECTING PATTERNS OF A SUBSTRATE

RELATED APPLICATIONS

This application is a Divisional of U.S. patent application Ser. No. 11/344,101, filed on Feb. 1, 2006, now abandoned claiming priority of Japanese Patent Application Nos. 2005-025480, filed on Feb. 1, 2005, 2005-067664, filed on Mar. 10, 2005, and 2005-251237, filed on Aug. 31, 2005, the entire contents of each of which are hereby incorporated by reference.

BACKGROUND OF THE INVENTION

The invention relates to a pattern inspection apparatus of a substrate having a fine circuit pattern like a semiconductor device, liquid crystal, or the like and, more particularly, to a pattern inspection apparatus which is suitable when it is applied to a pattern inspection on a wafer during a semiconductor device manufacturing step.

An inspection of a semiconductor wafer will be described as an example. A semiconductor device is manufactured by repeating a step of transferring a pattern formed on a photomask onto the semiconductor wafer by a lithography process and an etching process. In the manufacturing step of the semiconductor device, whether or not the lithography process, the etching process, and the like have correctly been executed, occurrence of a foreign matter, or the like largely influences on a yield of the semiconductor device. Therefore, a method of inspecting the pattern on the semiconductor wafer in order to early or preliminarily detect an abnormality or occurrence of a defect has been executed hitherto.

As a method of inspecting the defect existing in the pattern on the semiconductor wafer, a defect inspection apparatus in which white light is irradiated onto the semiconductor wafer and the same kinds of circuit patterns of a plurality of LSIs are compared by using an optical image has been put into practical use. An outline of the inspection system has been disclosed in "Monthly Semiconductor World", pages 96-99, August, 1995. According to the inspecting method using the optical image, there have been disclosed: a system in which an area on a substrate which has been optically illuminated is formed as an image by a time delay integration sensor and the image is compared with design characteristics which have previously been inputted, thereby detecting the defect as disclosed in JP-A-3-167456; and a method whereby image deterioration at the time of obtaining an image is monitored and it is corrected upon detection of the image, thereby performing comparison inspection in a stable optical image as shown in JP-B-6-58220. In the case where the semiconductor wafer in the manufacturing step is inspected by such optical inspection systems as mentioned above, a residual or a defect of the pattern having a silicon oxide film or a photosensitive photoresist material through which light is transmitted on the surface cannot be detected. An etching residual or non-opening defect of a micro conductive hole which is equal to or smaller than resolution of an optical system cannot be detected either. Further, a defect occurring in a stairway bottom portion of a wiring pattern cannot be detected.

As mentioned above, since the defect detection by the optical image becomes difficult due to fine patterning of the circuit pattern, complication of the circuit pattern shape, and variation of the material, a method of comparison inspecting the circuit pattern by using an electron beam image whose resolution is higher than that of the optical image has been proposed. In the case of comparison inspecting the circuit pattern by the electron beam image, it is necessary to obtain the image at a very high speed as compared with that in the observation by a scanning electron microscopy (hereinafter, abbreviated to SEM) in order to obtain a practical inspecting time. It is necessary to assure the resolution of the image obtained at the high speed and an S/N ratio of the image.

As a comparison inspection apparatus of the pattern using the electron beam, in J. Vac. Sci. Tech. B, Vol. 9, No. 6, pp. 3005-3009 (1991), J. Vac. Sci. Tech. B, Vol. 10, No. 6, pp. 2804-2808 (1992), JP-A-5-258703, and U.S. Pat. No. 5,502, 306, there has been disclosed a method whereby an electron beam having an electron beam current which is 100 or more times (10 nA or more) as large as that of the ordinary SEM is irradiated onto a conductive substrate (X-ray mask or the like), one of a secondary electron, a reflection electron, and a transmission electron which are generated is detected, and an image formed from its signal is comparison inspected, thereby automatically detecting a defect.

As a method of inspecting or observing a circuit substrate having an insulating material by an electron beam, in JP-A-59-155941 and in "Electron, Ion Beam Handbook", (The Nikkan Kogyo Shimbun Ltd.), pages 622-623, there has been disclosed a method of obtaining a stable image by irradiating a low-acceleration electron beam of 2 keV or less in order to reduce an influence of charging. Further, a method of irradiating ions from the back surface of a semiconductor substrate has been disclosed in JP-A-2-15546. A method of setting off charging to an insulating material by irradiating light onto the surface of a semiconductor substrate has been disclosed in JP-A-6-338280.

In the case of the electron beam of a large current and low acceleration, it is difficult to obtain an image of high resolution due to a space-charge effect. As a method of solving such a problem, however, a method whereby a high-acceleration electron beam is decelerated just before a sample and irradiated substantially as a low-acceleration electron beam on the sample has been disclosed in JP-A-5-258703.

As a method of obtaining an electron beam image at a high speed, a method of obtaining such an image by continuously irradiating an electron beam onto a semiconductor wafer on a sample stage while continuously moving the sample stage has been disclosed in JP-A-59-160948 and JP-A-5-258703. As a detection apparatus of a secondary electron which has been used in the conventional SEM, a construction by a scintillator (Al-deposited phosphor), a light guide, and a photomultiplier has been used. However, in such a type of detection apparatus, since the light emission by phosphor is detected, frequency response characteristics are bad and it is improper to form the electron beam image at a high speed. To solve such a problem, as a detection apparatus for detecting a secondary electron signal of a high frequency, detecting means using a semiconductor detector has been disclosed in JP-A-5-258703.

For inspection of an external appearance of a repetitive pattern represented by a semiconductor wafer, there has been known a comparison system in which an external appearance of an object to be inspected (hereinafter, referred to as an inspection object) is photographed, a reference image serving as a reference of the inspection is compared with image data of an inspection image serving as an inspection target and, if there is a difference between the compared data, such a case is extracted as a defect. In the case of such a comparison system, it is presumed as a prerequisite that the reference image and the inspection image are the same pattern. Such a method is effective to the inspection target in which the same circuit pattern has repetitively formed like a semiconductor wafer. As a reference image, there is a case where design information or a real pattern which is adjacent or close to the inspection image is used. If the inspection object is the semiconductor wafer, a number of chips (1 device) having the same circuit pattern are arranged on one wafer. A method of respectively comparing photographed images of those chips as reference images and inspection images is called a die comparison. A method of respectively comparing photographed images of the patterns repetitively arranged in the same chip as reference images and inspection images is called a cell comparison. As an example of such comparison inspection using the images, a technique disclosed in JP-A-9-89794 has been known.

In association with the realization of high functions of a semiconductor, a wafer in which a plurality of cell mat areas exist on one chip and, since design rules in the cell mat areas differ, cell pitch intervals for the comparison inspection differ has appeared. Further, in association with the production of a small quantity and many kinds, it is demanded to shorten a recipe forming time and an inspecting time. In the conventional inspection apparatus, processes in which the cell pitch of each cell area is measured/calculated, the inspection is made every cell area, and thereafter, inspection results of the respective cell areas which are obtained from them are integrated as one inspection result are executed. An ease of use is bad in both of management and creation of the recipe. Further, since a plurality of inspection steps are executed every cell, there is such a drawback that the inspecting time becomes long.

In the case of any of the cell comparison and the die comparison, as for the image data which is transferred to a defect analyzing unit, the reference image and the inspection image need to be transferred as a pair. In the case of the die comparison, the image which is one-chip precedent to the inspection image is generally used as a reference image. However, for example, if a defect is detected in the first chip shown in FIG. 16A, since the one-chip precedent image does not exist and there is no reference image, defect analysis of the first chip is impossible. Further, if a defect is detected in the (n+1)th chip in a wafer edge portion as shown in FIG. 16A, the data of the nth chip which is one-chip precedent exists as image data. However, in the case of the external appearance inspection of the semiconductor wafer, in the reference image for the inspection image, the farther a distance is physically away, the more the peripheral conditions upon obtaining the images are different. Therefore, the reference image includes a larger amount of positional deviation error and a larger amount of error of image concentration or the like and cannot be used as a reference image. Therefore, even if the defect is detected in the (n+1)th chip in the wafer edge portion, the defect analysis is impossible.

Likewise, in the die comparison, in the case of executing such an operation that a scan on the wafer is turned back at the edge of the wafer and the image is repetitively photographed as shown in FIG. 16B, when a defect is detected in the (n+1)th chip and the image is compared with that of the nth chip, if such a case is compared with the relation between the (n+1)th chip and the nth chip in the case of FIG. 16A, the physical positions are close. However, since columns of the (n+1)th chip and the nth chip of the chip layouts are different in FIG. 16B, when compared with the relation between the adjacent chips of the same column (for example, the nth chip and the (n−1)th chip), the conditions upon obtaining the images are different and the reference image includes a larger amount of positional deviation error and the like. Although there is no problem if such an error lies within a correction range of an image processing function, if not, even in the case of FIG. 16B, there is also a possibility that the image of the nth chip cannot be used as a reference image of the (n+1)th chip.

As mentioned above, if the defect is detected in the chip in the semiconductor wafer edge portion and becomes a defect analysis target, since the one-chip precedent image does not exist, the reference image does not exist and a situation that the defect analysis cannot be performed occurs.

In the cell comparison, if a defect is detected in each of circuit patterns having different cell pitch areas such as cell pitch A area 1503 and cell pitch B area 1504 mounted in one chip as shown in FIG. 15, image data for analyzing the defect detected in the cell pitch A area needs image data at a position where the reference image is away from the inspection image by a distance corresponding to a cell pitch A, and image data for analyzing the defect detected in the cell pitch B area needs image data at a position where the reference image is away from the inspection image by a distance corresponding to a cell pitch B. That is, in the case of the cell comparison, the position of the reference image for the inspection image differs depending on the cell pitch area where the defect has been detected. However, hitherto, a plurality of cell pitches in the case of the cell comparison cannot be designated. Therefore, the inspection of the cell pitch A area and the inspection of the cell pitch B area cannot be simultaneously performed. The inspection of the areas of the different cell pitches is performed in accordance with a flow shown in FIG. 17.

In FIG. 17, first, the cell pitch of the inspection area is set (S1701) and an image photographed by a sensor is stored into an image memory 1105 (S1702). Subsequently, an extracting position of the inspection image and reference image position information are set (S1703). The inspection image and the reference image are extracted from the image memory 1105 on the basis of those position information and transferred to a defect analyzing unit 1108 (S1704). Since only one cell pitch is set in S1701, information showing whether or not the inspection of the areas of the different cell pitches is necessary is inputted (S1705). If it is necessary, the processing routine is returned to S1701 and the above processing loop is repeated. As mentioned above, according to the related art, since it is necessary to set the cell pitch for each cell pitch area and execute the inspection again, efficiency is very low.

Further, in the die comparison and the cell comparison, since definitions of the reference images which are necessary for the inspection images are different, the cell comparison and the die comparison cannot be mixedly executed.

In association with the realization of high functions of a semiconductor, a wafer in which a plurality of memory cell areas of different design rules exist on one chip has appeared. Further, in association with the production of a small quantity and many kinds, it is demanded to shorten the recipe forming time and the inspecting time. If the design rules differ, in addition to the existence of the plurality of cell mat areas as mentioned above, degrees of fineness and coarseness of the memory cell patterns are different, so that brightness values of the detected images differ. Therefore, it is necessary to change an inspection threshold value every memory cell area. In the conventional inspection apparatus, processes in which the inspection threshold value is changed every memory cell area, the inspection is repetitively executed, and thereafter, inspection results of the respective memory cell areas which are obtained are integrated as one inspection result are executed. There is such a drawback that the inspecting time becomes long because a plurality of inspecting steps are repeated. Further, since a plurality of recipes are needed for one inspection, ease of use is bad in both of the management of the inspection recipes and the creation of the recipes.

SUMMARY OF THE INVENTION

The invention is made in consideration of the above problems and it is an object of the invention to provide an inspection apparatus and an inspecting method for inspecting circuit patterns which can shorten an inspecting time by improving a recipe forming function of a wafer external appearance inspection apparatus, improving ease of use, and improving an inspecting function.

It is another object of the invention to solve such a problem in the conventional technique that, in the die comparison inspection, for a chip existing in an edge portion of a semiconductor wafer, since a one-precedent chip does not exist, a reference image cannot be defined and a defect analysis cannot be performed.

It is still another object that, in the cell comparison inspection, defects existing in different cell pitch areas are efficiently analyzed at a high speed.

It is further another object to enable mixture comparison of the cell comparison and the die comparison.

It is further another object of the invention to provide an inspection apparatus for inspecting circuit patterns which can shorten the inspecting time by improving the recipe forming function of the wafer external appearance inspection apparatus, improving the ease of use, and improving the inspecting function.

To accomplish the above objects, according to the invention, there is provided a pattern inspection apparatus comprising:

irradiating means for irradiating light, a laser beam, or a charged particle beam onto a substrate on which patterns have been formed;

detecting means for detecting a signal which is generated from the substrate by the irradiation;

image data storing means for forming an image from the signal detected by the detecting means and storing image data;

comparing condition designating means for designating information of an inspection area on the substrate and information of a comparing period in association with each other;

comparing means for comparing the image data stored in the image data storing means with another image data corresponding to the comparing period designated for the inspection area to which the image data belongs in accordance with the information of the inspection area and the information of the comparing period designated by the comparing condition designating means; and discriminating means for discriminating a defect on the patterns from a comparison result of the comparing means.

The comparing condition designating means can designate the inspection area by start coordinates and end coordinates and designate the comparing period every inspection area. The comparing condition designating means can be set as a recipe file.

When a plurality of inspection areas of different comparing periods are designated by the comparing condition designating means, the comparing means compares the image data of each inspection area with another image data corresponding to the comparing period designated for such an inspection area. Different comparing periods may be also designated for a plurality of inspection areas on a same stripe.

When a plurality of comparing periods are designated for one inspection area by the comparing condition designating means, the comparing means compares the image data of this inspection area with a plurality of image data corresponding to the plurality of comparing periods.

For example, the irradiating means scans and irradiates an electron beam in one-dimensional direction and has a stage for moving the substrate in the direction which crosses the electron beam scanning direction. The image data may be also one-dimensional image data.

To solve the above problems, according to the invention, as information to read out the image data for an inspection image and a reference image from the image memory, in addition to position information of the inspection image, reference image information comprising identification information to identify the cell comparison or the die comparison, a cell pitch in the case of the cell comparison, relative position information of the chip in the case of the die comparison, and the like can be individually set for each inspection image.

According to the invention, there is provided an external appearance inspection apparatus of a semiconductor wafer, comprising:

an image memory for storing image data obtained by photographing the semiconductor wafer; and a memory controller for extracting an inspection image and a reference image for comparison from the image memory and transferring them to an image processing unit, wherein the memory controller receives a head address of a defective image in the image memory and reference image information showing a relative position of the reference image for the defective image, extracts the inspection image from the image memory by using the received head address of the defective image, and extracts the reference image from the image memory by using the received head address of the defective image and the reference image information. As reference image information, relative position information of a chip in a die comparison or a cell pitch in a cell comparison can be used.

According to the invention, there is provided an external appearance inspection apparatus of a semiconductor wafer, comprising:

an image memory for storing image data obtained by photographing the semiconductor wafer on which a plurality of chips have been formed;

a memory controller for extracting an inspection image and a reference image for comparison from the image memory and transferring them to an image processing unit; and a whole control unit for holding information regarding an obtaining method of the reference image in each area in the chip, forming reference image information showing the obtaining method of the reference image for a defective image on the basis of a position of a detected defect in the chip, and outputting a head address of the defective image in the image memory and the reference image information to the memory controller, wherein the memory controller extracts the inspection image from the image memory by using the head address of the defective image received from the whole control unit and extracts the reference image from the image memory by using the head address of the defective image and the reference image information. The reference image information in this case can include identification information to identify a cell comparison or a die comparison, a cell pitch in the case of the cell comparison, and relative position information of the chip in the case of the die comparison. The memory controller holds a memory table in which the head address of the defective image and the corresponding reference image information have been recorded for each defect.

To accomplish the above objects, according to the invention, there is provided a pattern inspection apparatus comprising:

irradiating means for irradiating light, a laser beam, or a charged particle beam onto a substrate on which patterns have been formed;

detecting means for detecting a signal which is generated from the substrate by the irradiation;

image data storing means for forming an image from the signal detected by the detecting means and storing image data;

inspecting condition setting means for setting information of an inspection area on the substrate and information of an inspection threshold value as a defect discriminating condition in association with each other;

comparing means for comparing the image data stored in the image data storing means with another corresponding image data in accordance with the information of the inspection area and the information of the inspection threshold value set by the inspecting condition setting means; and discriminating means for discriminating a defect on the patterns from a comparison result of the comparing means.

According to the invention, the inspecting method and inspection apparatus for inspecting the circuit patterns with a high throughput can be provided by having a display screen for setting the cell areas of the different cell comparison pitches and having a function which enables the cell areas of the different cell comparison pitches to be inspected by one inspection.

According to the invention, the existence of an uninspectable area at the time of the die comparison can be avoided. Also in the case of extracting the defective images in the different cell pitch areas, the inspection can be performed in one inspection. Further, since the mixture inspection of the cell comparison and the die comparison can be performed, the inspecting efficiency is improved.

According to the invention, since a plurality of inspection areas can be inspected in a lump by different inspection threshold values, the throughput can be improved.

BRIEF DESCRIPTION OF THE DRAWINGS

FIG. 23 is a diagram showing contents of the duplexed memory tables;

FIGS. 26A to 26C are diagrams showing the cell comparison inspecting operation according to the invention;

DETAILED DESCRIPTION OF THE EMBODIMENT

An example of inspecting method and apparatus according to an embodiment of the invention will be described in detail hereinbelow with reference to the drawings.

Figure 1:
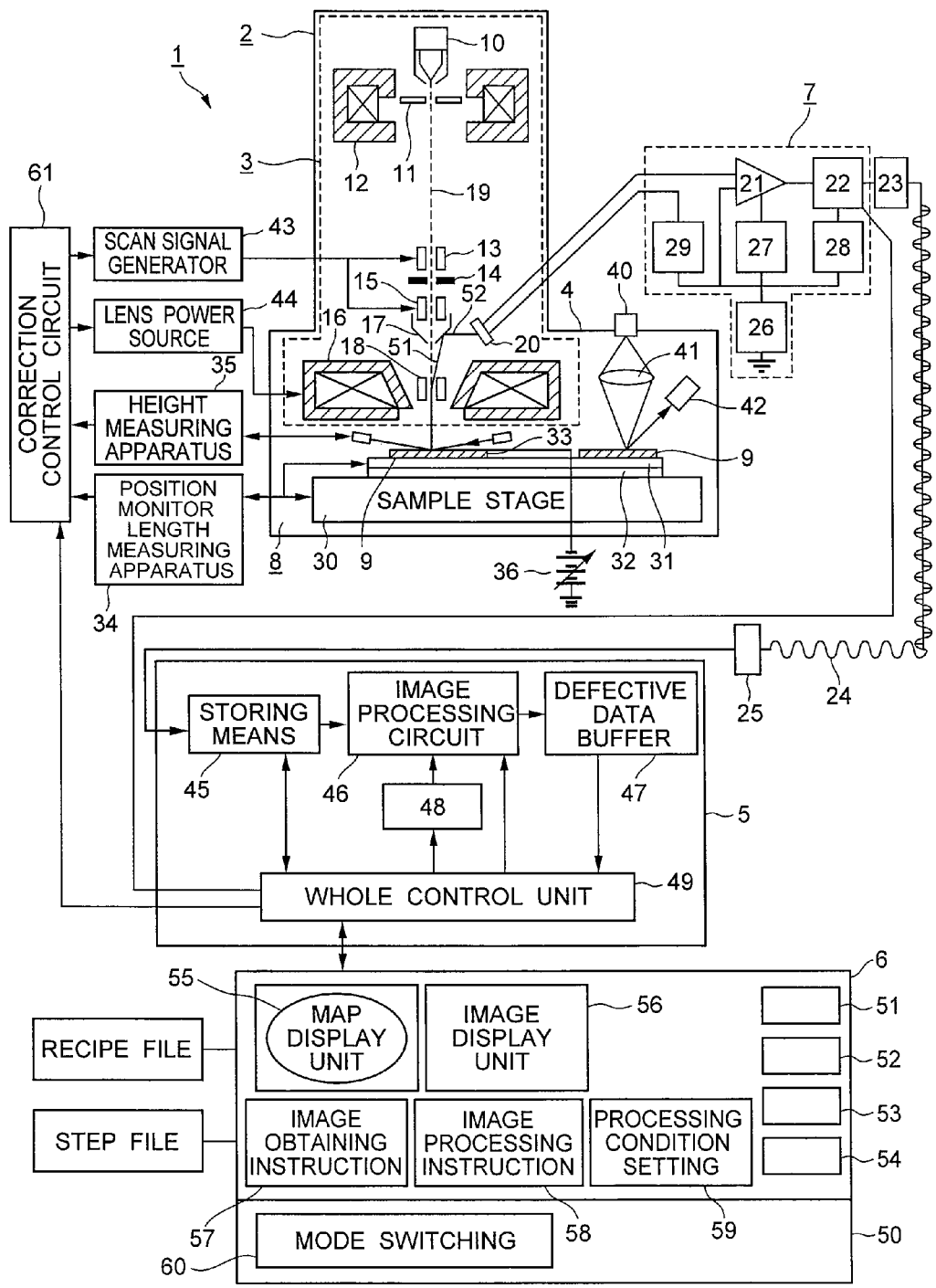
FIG. 1 is a diagram showing a constructional example of a circuit pattern inspection apparatus using charged particles according to the invention.

FIG. 1 is a diagram showing a constructional example of a circuit pattern inspection apparatus 1 using charged particles of the invention. The circuit pattern inspection apparatus 1 has: an inspection room 2 in which the air is vacuum-exhausted; and a spare room (not shown in the embodiment) to convey a substrate 9 to be inspected (hereinafter, also referred to as an inspection substrate) into the inspection room 2. The spare room is constructed so that the vacuum evacuation can be performed independent of the inspection room 2. In addition to the inspection room 2 and the spare room, the circuit pattern inspection apparatus 1 is constructed by a control unit 6 and an image processing unit 5. The inside of the inspection room 2 is mainly constructed by: an electronic optical system 3; a secondary electron detecting unit 7; a sample chamber 8; and an optical microscope unit 4. The electronic optical system 3 is constructed by: an electron gun 10; an electron beam lead-out electrode 11; a capacitor lens 12; a blanking deflector 13; a scan deflector 15; a diaphragm 14; an objective lens 16; a reflecting plate 17; and an ExB deflector 18. In the secondary electron detecting unit 7, a secondary electron detector 20 is arranged above the objective lens 16 in the inspection room 2. An output signal of the secondary electron detector 20 is amplified by a preamplifier 21 attached outside of the inspection room 2 and converted into digital data by an A/D converter 22.

The sample chamber 8 is constructed by: a sample stage 30; an X stage 31; a Y stage 32; a rotary stage 33; a position monitor length measuring apparatus 34; and an inspection substrate height measuring apparatus 35. The optical microscope unit 4 is arranged near the electronic optical system 3 in the inspection room 2 and at a position where it is away from the optical system 3 so as not to exert an influence on each other. A distance between the electronic optical system 3 and the optical microscope unit 4 has already been known. The X stage 31 and the Y stage 32 are reciprocatively moved in a range of the known distance between the electronic optical system 3 and the optical microscope unit 4. The optical microscope unit 4 is constructed by: a light source 40; an optical lens 41; and a CCD camera 42.

The image processing unit 5 is constructed by: storing means 45; an image processing circuit 46; a defective data buffer 47; and an arithmetic operating unit 48. A fetched electron beam image or optical image is displayed by a monitor 50. An operation command and operating conditions of each unit of the apparatus are inputted from the control unit 6. The conditions such as accelerating voltage upon generation of the electron beam, electron beam deflection width, deflecting speed, signal fetching timing of the secondary electron detecting apparatus, sample stage moving speed, and the like are inputted so that they can be arbitrarily or selectively set in accordance with an object. The control unit 6 monitors a deviation of the position or height from detection signals of the position monitor length measuring apparatus 34 and the inspection substrate height measuring apparatus 35 by using a correction control circuit 61, forms a correction signal from a monitoring result, and sends the correction signal to the objective lens 16 and the scan deflector 15 so that the electron beam is always irradiated to the correct position.

To obtain an image of the inspection substrate 9, a primary electron beam 19 converged thinly is irradiated to the inspection substrate 9 and secondary electrons 51 are generated and detected synchronously with the scan of the primary electron beam 19 and the movement of the stages 31 and 32, thereby obtaining the image of the surface of the inspection substrate 9. In an automatic inspection apparatus, it is indispensable that the inspecting speed is high. Therefore, a low-speed scan of the electron beam of an electron beam current of a pA order, a scan of a number of times, and overlapping of the images as in the ordinary SEM are not executed. To suppress charging to an insulating material, it is also necessary to scan the electron beam once at a high speed or scan it about a few times. In the embodiment, therefore, the image is formed by scanning only once the electron beam of a large current which is about 100 or more times as that of the ordinary SEM, for example, 100 nA. A scan width is set to 100 μm, one pixel is set to 0.1 μm$^\square$, and one scan is executed for 1 μsec.

A thermo field emission electron source of a diffusion supply type is used as an electron gun 10. By using the electron gun 10, the electron beam current which is more stable as compared with, for example, a conventional tungsten (W) filament electron source or cold field emission electron source can be assured, so that the electron beam image of a small brightness fluctuation is obtained. Since the electron beam current can be largely set by the electron gun 10, a high-speed inspection as will be explained hereinafter can be realized. The primary electron beam 19 is pulled out of the electron gun 10 by applying a voltage between the electron gun 10 and the electron beam lead-out electrode 11. The primary electron beam 19 is accelerated by applying a negative electric potential of a high voltage to the electron gun 10. Thus, the primary electron beam 19 progresses in the direction of the sample stage 30 by an energy corresponding to the electric potential, is converged by the capacitor lens 12, further thinly converged by the objective lens 16, and irradiated onto the inspection substrate 9 (substrate having fine circuit patterns, such as semiconductor wafer, chip, liquid crystal, mask, or the like) mounted on the X-Y stages 31 and 32 on the sample stage 30. A scan signal generator 43 for generating a scan signal and a blanking signal is connected to the blanking deflector 13. A lens power source 44 is connected to each of the capacitor lens 12 and the objective lens 16. A negative voltage can be applied to the inspection substrate 9 by a retarding power source 36. By adjusting the voltage of the retarding power source 36, the primary electron beam is decelerated and the electron beam irradiation energy to the inspection substrate 9 can be adjusted to an optimum value without changing the electric potential of the electron gun 10.

The secondary electrons 51 generated by irradiating the primary electron beam 19 onto the inspection substrate 9 are accelerated by the negative voltage applied to the inspection substrate 9. The ExB deflector 18 is arranged above the inspection substrate 9. The secondary electrons 51 accelerated by the ExB deflector 18 are deflected in a predetermined direction. A deflection amount can be adjusted by a voltage which is applied to the ExB deflector 18 and an intensity of a magnetic field. The electromagnetic field can be varied in association with the negative voltage applied to the sample. The secondary electrons 51 deflected by the ExB deflector 18 collide with the reflecting plate 17 under predetermined conditions. The reflecting plate 17 has a conical shape integrated with a shield pipe of the deflector of the electron beam which is irradiated to the sample (hereinbelow, this electron beam is referred to as a primary electron beam). When the accelerated secondary electrons 51 collide with the reflecting plate 17, second secondary electrons 52 having an energy of a few V to 50 eV are generated from the reflecting plate 17.

The secondary electron detecting unit 7 is constructed by: the secondary electron detector 20 arranged in the inspection room 2 which has been vacuum-evacuated; the preamplifier 21 arranged outside of the inspection room 2; the A/D converter 22; light converting means 23; light transmitting means 24; electric converting means 25; a high-voltage power source 26; a preamplifier driving power source 27; an A/D converter driving power source 28; and a reverse-bias power source 29. As already mentioned, in the secondary electron detecting unit 7, the secondary electron detector 20 is arranged above the objective lens 16 in the inspection room 2. The secondary electron detector 20, preamplifier 21, A/D converter 22, light converting means 23, preamplifier driving power source 27, and A/D converter driving power source 28 are floating to a positive electric potential by the high-voltage power source 26. The second secondary electrons 52 generated by the collision with the reflecting plate 17 are guided to the secondary electron detector 20 by a suction electric field. The secondary electron detector 20 is constructed so that the second secondary electrons 52 generated when the secondary electrons 51 generated for a period of time during which the primary electron beam 19 is being irradiated to the inspection substrate 9 are subsequently accelerated and collide with the reflecting plate 17 are detected synchronously with scan timing of the primary electron beam 19. An output signal of the secondary electron detector 20 is amplified by the preamplifier 21 attached outside of the inspection room 2 and converted into the digital data by the A/D converter 22. The A/D converter 22 is constructed so that after the analog signal detected by the secondary electron detector 20 is amplified the preamplifier 21, it is immediately converted into the digital signal and transmitted to the image processing unit 5. Since the detected analog signal is converted into the digital signal just after the detection and transmitted, the signal of a higher S/N ratio can be obtained at a higher speed as compared with the conventional ones.

The inspection substrate 9 is mounted on the X-Y stages 31 and 32. It is possible to select either a method whereby, when the inspection is executed, the X-Y stages 31 and 32 are held at rest and the primary electron beam 19 is two-dimensionally scanned or a method whereby, when the inspection is executed, the X-Y stages 31 and 32 are continuously moved in the Y direction at a constant speed and the primary electron beam 19 is rectilinearly scanned in the X direction. In the case of inspecting a specific relatively small area, the former method of inspecting by holding the stage at rest is effective. In the case of inspecting a relatively wide area, the latter method of inspecting by continuously moving the stages at the constant speed is effective. When it is necessary to blank the primary electron beam 19, it is possible to control in such a manner that the primary electron beam 19 is deflected by the blanking deflector 13 and the electron beam does not pass through the diaphragm 14. In the embodiment, a length measuring apparatus by laser interference is used as a position monitor length measuring apparatus 34. The positions of the X stage 31 and the Y stage 32 can be monitored in a real-time manner and transferred to the control unit 6. Data such as rotational speeds of motors of the X stage 31, Y stage 32, and rotary stage 33 and the like is also similarly transferred from the drivers to the control unit 6. On the basis of those data, the control unit 6 can accurately grasp the area and position where the primary electron beam 19 has been irradiated. A positional deviation of the irradiating position of the primary electron beam 19 is corrected by the correction control circuit 61 in a real-time manner as necessary. The area to which the electron beam has been irradiated can be stored every inspection substrate.

As an inspection substrate height measuring apparatus 35, an optical measuring apparatus as a measuring system other than the electron beam, for example, a laser interference measuring apparatus or a reflection light type measuring apparatus for measuring a change by the position of the reflection light is used. The measuring apparatus 35 is constructed so as to measure the height of inspection substrate 9 mounted on the X-Y stages 31 and 32 in a real-time manner. In the embodiment, there is used a system in which elongated white light which has passed through a slit is irradiated to the inspection substrate 9 through a window, the position of the reflection light is detected by a position detecting monitor, and a change amount of the height is calculated from a fluctuation of the position. On the basis of the measurement data of the inspection substrate height measuring apparatus 35, a focal distance of the objective lens 16 adapted to thinly converge the primary electron beam 19 is dynamically corrected, thereby enabling the primary electron beam 19 focused to an inspection area to be always irradiated. Since a warp and a height distortion of the inspection substrate 9 have previously been measured, it is also possible to construct in such a manner that correcting conditions of the objective lens 16 of each inspection area are set on the basis of those data.

The image processing unit 5 is constructed by the storing means 45, image processing circuit 46, defective data buffer 47, and arithmetic operating unit 48. The image signal of the inspection substrate 9 detected by the secondary electron detector 20 is amplified by the preamplifier 21 and converted into the digital data by the A/D converter 22. After that, it is converted into a photosignal by the light converting means 23, transmitted by the light transmitting means 24, again converted into the electric signal by the electric converting means 25, and subsequently stored into the storing means 45. By using the stored image signal, the image processing circuit 46 executes various image processes such as positioning of the images which are away from each other by a predetermined distance, standardization of a signal level, and removal of a noise signal and comparison-arithmetically operates the image signal. An absolute value of the comparison-arithmetically operated differential image signal is compared with a predetermined threshold value. If the level of the differential image signal is larger than the predetermined threshold value, its pixel is determined to be a defect target and its position, the number of defects, and the like are displayed on the monitor 50.

Figure 4:
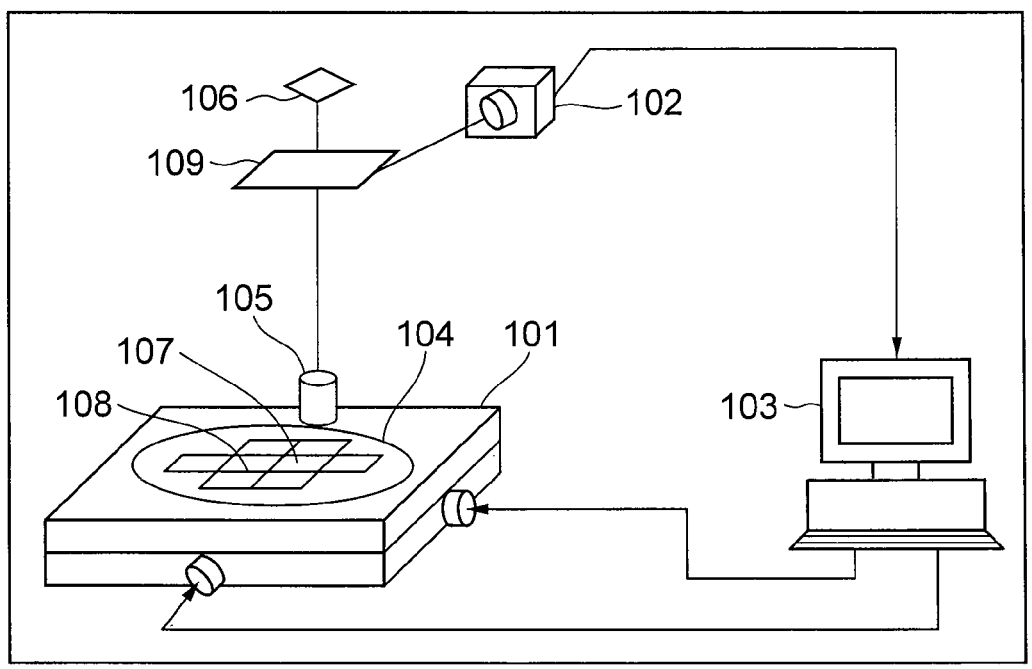
FIG. 4 is a diagram showing a constructional example of a circuit pattern inspection apparatus using light or a laser beam.

A whole construction of a wafer external appearance inspection apparatus in the case of using a laser beam will be explained. FIG. 4 is a block diagram showing the whole construction of the wafer external appearance inspection apparatus according to an embodiment of the invention. An inspection wafer 104 is put on an X-Y stage 101. Chips are regularly arranged and formed in a lattice shape on the inspection wafer 104. A control unit 103 moves the X-Y stage 101 by a distance which is integer times as large as a chip pitch. Light from a light source 106 is irradiated onto the inspection wafer 104. The light reflected by the inspection wafer 104 passes through an objective lens 105, is divided into light to a plurality of optical paths by a half mirror 109, and is detected as a two-dimensional image by a CCD camera 102.

The X-Y stage 101 is moved by a distance of the chip pitch by the control unit 103, so that an image at the same point of a comparison chip 108 as that of an inspection chip 107 can be obtained. On the basis of a difference of concentration at the same point of the inspection chip 107 and the comparison chip 108, if the concentration difference is larger than a predetermined threshold value, the control unit 103 determines that there is a defect at the inspected point of the inspection chip 107.

Figure 2:
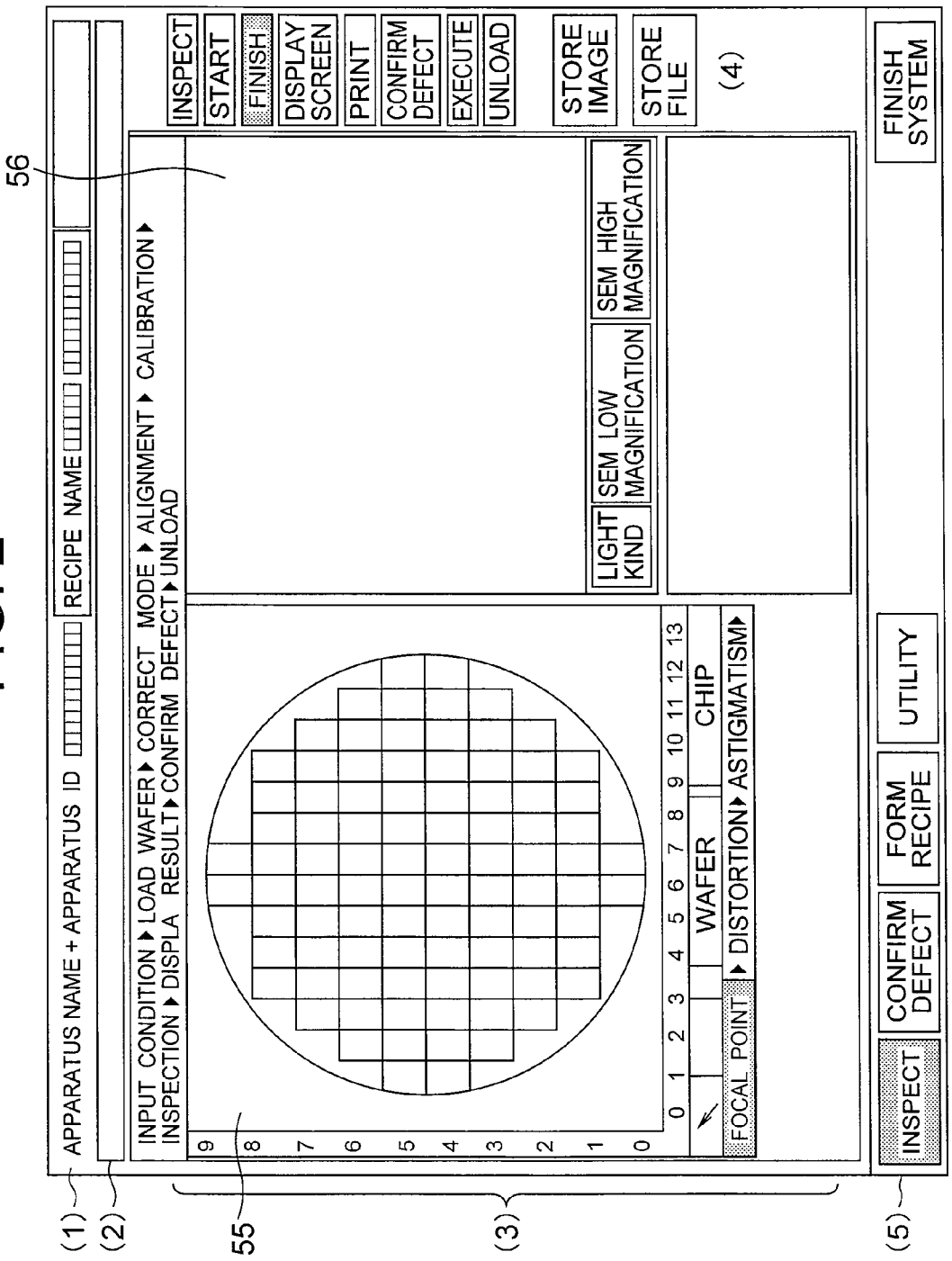
FIG. 2 is a diagram showing a constructional example of a monitor unit of the circuit pattern inspection apparatus.

FIG. 2 is a diagram showing a constructional example of a monitor unit. A display screen of the monitor is mainly divided into five areas. An area (1) is arranged in an upper portion of the display screen. An apparatus name, an apparatus ID, and recipe names such as kind file name, step file name, and the like are displayed there. A guidance to explain the operation and a state is displayed in an area (2). A map display portion 55 and an image display portion 56 are included in an area (3) at the center of the display screen. Display contents are changed in accordance with the operation or a progressing state. Operation buttons which are necessary in common for a plurality of display screens are displayed in an area (4) on the right side of the display screen. There are "print", "store file", "start", "end", "store image", and the like. For example, by clicking "store file", a display screen to designate the names of the kind file and the step file to store the recipe which is at present being formed is displayed. By clicking "store image", a display screen to designate a name for storing the image which is at present being displayed as an image file is displayed. A mode name is displayed in an operation area (5) in a lower portion of the display screen. For example, by clicking "inspect", a mode to execute automatic inspection is set. By clicking "form recipe", a mode to input the above parameters is set.

Figure 3:
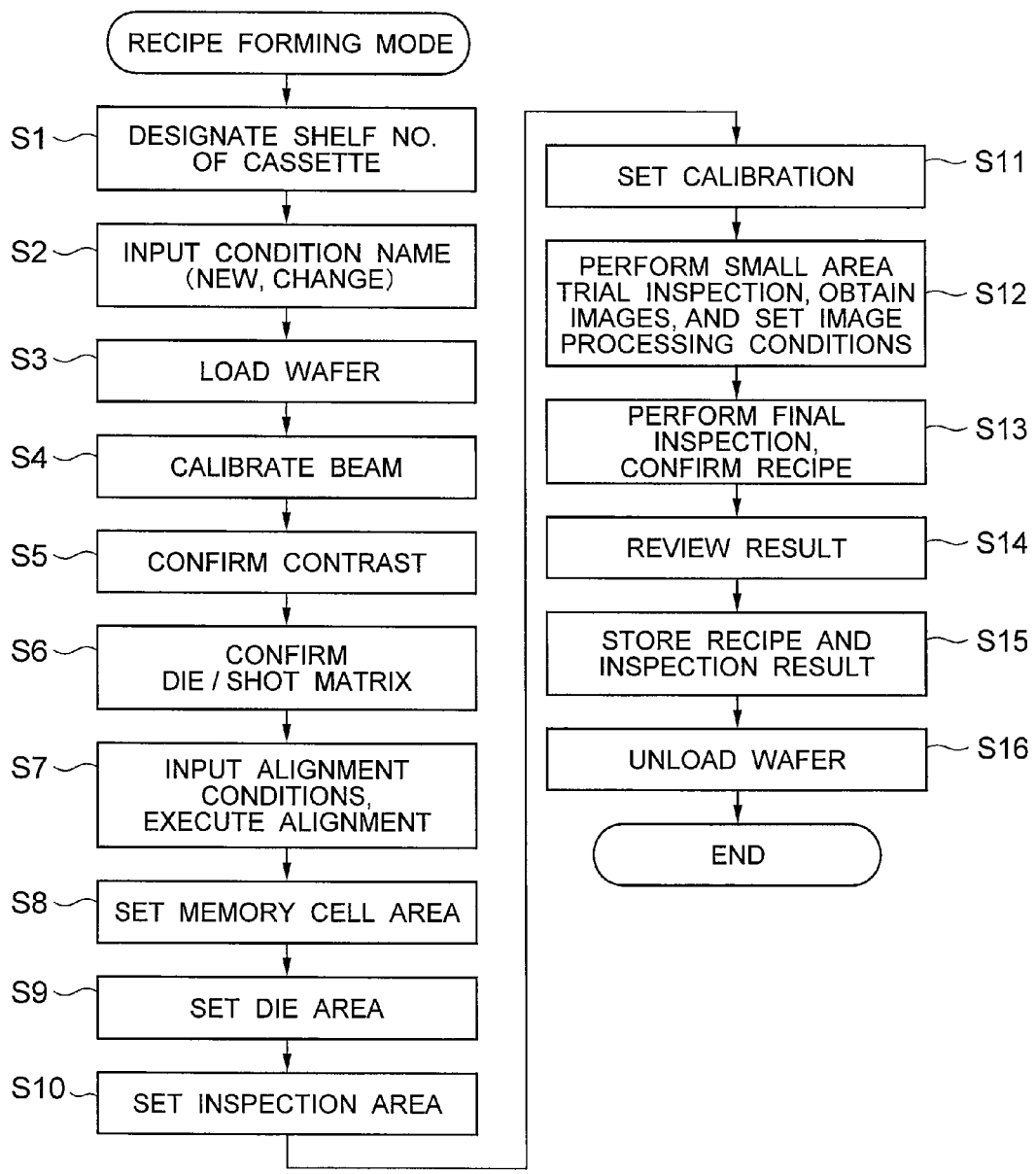
FIG. 3 is a flowchart showing a recipe forming process.

A method of forming the recipe will now be described. FIG. 3 shows a processing flow for the recipe forming mode. When the mode of "form recipe" is selected in the initial display screen of FIG. 2, mode switching means 60 functions and the initial display screen is switched to the display screen to form the recipe shown in FIG. 3. When the start button is clicked in this display screen, since shelf numbers of CDs have been displayed, a desired shelf number is first designated (S1). Subsequently, the recipe file is called, a kind condition indicative of "new" or "change" is inputted, and a lot ID and a wafer ID are inputted (S2). The "change" is a change of the recipe forming conditions irrespective of "load" or "does not load" and is mainly set to the change of "load". Since recipes of other apparatuses, which will be explained hereinafter, cannot be directly inputted, a file of an inspection result (defect information file: contents of this file have been opened to the user) is inputted and converted. A recipe for his own apparatus is formed and changed in this step in order to supplement insufficient data.

A mode "newly form" is set and, subsequently, a wafer cassette is set into a loader of the inspection apparatus (S3). As processing items, there are the following items: (1) OF or a notch is detected; (2) it is held in a sample holder (sample exchange room), and (3) the stage is moved and put onto a inspection room stage. Subsequently, it is moved to a stage reference mark and an absolute calibration of the beam is performed (S4). In this case, a calibration based on default recipe file conditions is performed. (1) The beam irradiation, (2) deflection correction and reference coordinates correction, and (3) focal point parameter correction are performed. Subsequently, the electron beam is irradiated to a designated position on the sample and a focal point and astigmatism are adjusted again after confirming an image contrast on the sample (S5). In this instance, if a sufficient contrast cannot be obtained, the electron beam irradiating conditions are changed. The irradiating conditions and the conditions of the focal point and the astigmatism designated here are stored as recipe parameters into the step file.

After the electron beam irradiating conditions are determined and the contrast are confirmed, a shot of the wafer and a size and a layout of the die (chips) are inputted (S6). After the shot size and a shot matrix are inputted and the layout of the die in the shot are inputted, the presence or absence of the shot or die of a peripheral portion of the wafer is designated. The shot and the die layout which have been set here are stored as parameters in the recipe file.

Subsequently, alignment conditions are inputted and the alignment is executed (S7). Specifically speaking, (1) alignment chips are designated (a plurality of points), (2) the stage is moved to an origin of the first chip, (3) the monitor is switched to an optical microscope monitor, and (4) the stage is manually moved to an alignment mark position of the first chip. (5) An optical image is registered, (6) the mode is switched to an SEM image mode, (7) the stage is finely manually adjusted to the alignment mark position, (8) an SEM image is registered, and (9) alignment coordinates are registered. As items for executing the alignment, (1) the stage is moved to the first point, (2) the image input, search, and matching are executed, (3) the stage is moved to the second point, (4) the image input, search, and matching are executed, (5) the movement to a residual point, search, and matching are executed, and (6) an inclination, a position, an interval between the chips are corrected.

As offset setting of the chip origin, the following operations are executed: (1) movement to a last point alignment mark; (2) designation of the alignment mark position (SEM image mode); (3) movement to the origin of the first point chip; (4) designation of the chip origin position (SEM image mode); and (5) calculation and registration of an offset between the chip origin and the alignment mark. The "offset" of the chip origin denotes a distance between the alignment coordinates and the origin coordinates of the chip where the mark exists.

As mentioned above, an offset value between the designated pattern coordinates for the alignment and the chip origin is inputted and registered as an alignment parameter in the step file. In the recipe forming, since there are many parameters to designate the coordinates for executing various processes on the wafer, the alignment conditions are first decided and registered and the processes up to the alignment are executed.

Subsequently, setting of the memory cell area in the chip is performed (S8). As setting items, there are (1) an input of the cell area, (2) an input of the cell pitch, and (3) registration of (1) and (2). The cell area is inputted by using the optical microscope image and the electron beam image. Subsequently, die area setting is performed (S9). As setting items, there are (1) input of the die area, (2) input of the die inspection area, and (3) registration of (1) and (2). The die area is also inputted by using the optical microscope image and the electron beam image.

Subsequently, the inspection area is designated (S10). Upon designation of the inspection area, two kinds of the inspection die and the inspection area in the die can be designated. If there is no need to inspect all dies or if the user wants to inspect only the specific area in the die, it can be arbitrarily designated as will be explained hereinafter. Further, an inspection sampling ratio can be designated for the designated area. The inspecting direction can be also designated. The data of the die area and the inspection area are stored as parameters in the step file.

After completion of the designation of the inspection area, the process is shifted to calibration setting to adjust the brightness upon inspection (S11). Upon calibration, the image is obtained and gain control of hardware and brightness correction according to a signal amount are performed in accordance with distribution of the brightness. Actually, the die whose calibration is made is designated, the coordinates in the die are designated, and the calibration is performed. The coordinate values, the gain of the brightness, and the offset value to which the calibration is made are stored as parameters in the step file.

Subsequently, the image is actually obtained under the various conditions which have been set so far and image processing conditions to detect the defects are set (S12). First, when the image is obtained, the kind of file which is subjected to the detection signal is selected. The image of a small area in one chip is actually obtained under the same conditions as those for the inspection. The small area indicates an area, for example, having a width of 100 μm as a scan width of the electron beam and a length of one chip. After the image is obtained, a threshold value to discriminate the defect is inputted and the image at the position where it is determined that there is a defect is displayed. By repeating the above processes, the optimum inspecting conditions are determined. Such a series of processes is called "small area trial inspection". The parameters such as threshold value, file, and the like which have been set here are stored as parameters in the step file.

By the above various inputting processes, various parameters necessary for the inspection can be set. However, in the actual semiconductor wafer, since there are variations in processes in the wafer planes or manufacturing lots, the settings of the image processing conditions in the small area trial inspection are insufficient. It is necessary to decide the defect discriminating threshold value in consideration of such variation amounts.

Therefore, the final inspection is performed by the formed recipe file (S13). That is, (1) the stage is continuously moved at a constant speed and the position and the height are monitored, (2) the beam scan and the real-time correction (stage, Z sensor tracking) are made, (3) the detection of the secondary electrons, the A/D conversion, and the input to the image memory are executed, (4) the image process and the comparison discrimination are made, (5) the beam is corrected every N stripes, and (6) the number of defects and the positions of the defects are displayed. A defect detection level and an erroneous detection level are confirmed on the basis of the result of the monitor (S14). If the proper conditions are finally obtained, the various parameters which have been inputted so far are registered into the kind file and step file (S15). Finally, the wafer is unloaded (S16).

In the invention, the step (S8) of setting the memory cell area in the chip of the recipe forming is improved, thereby enabling the cell areas having a plurality of different cell pitches and the cell pitches to be set.

Figure 5:
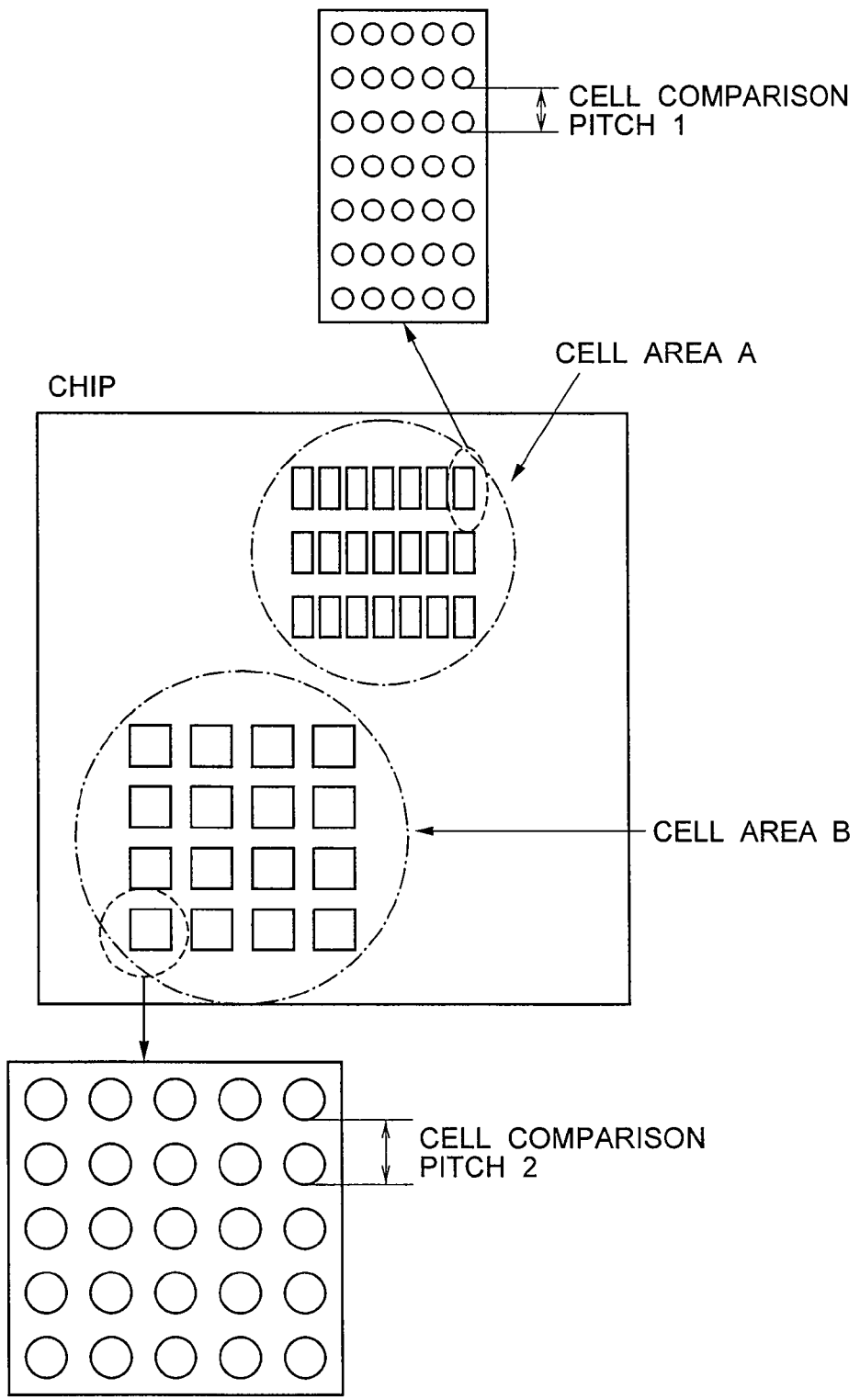
FIG. 5 is an explanatory diagram showing an example of cell areas.

The cell pitch will be described with reference to FIG. 5. As shown in FIG. 5, in the cell area in the chip, the same pattern is periodically repeated. The images are compared in accordance with the repetitive period and the pattern in which the brightness, size, and the like of the image differ is determined to be the defect. Such a comparing period is called a cell comparison pitch. There is a case where a plurality of different cell areas exist in the chip. In this case, there is a case where different cell comparison pitches exist in such a manner that there is a cell comparison pitch having a value of pitch 1 in a cell area A and there is a cell comparison pitch having a value of pitch 2 in a cell area B.

Figure 6:
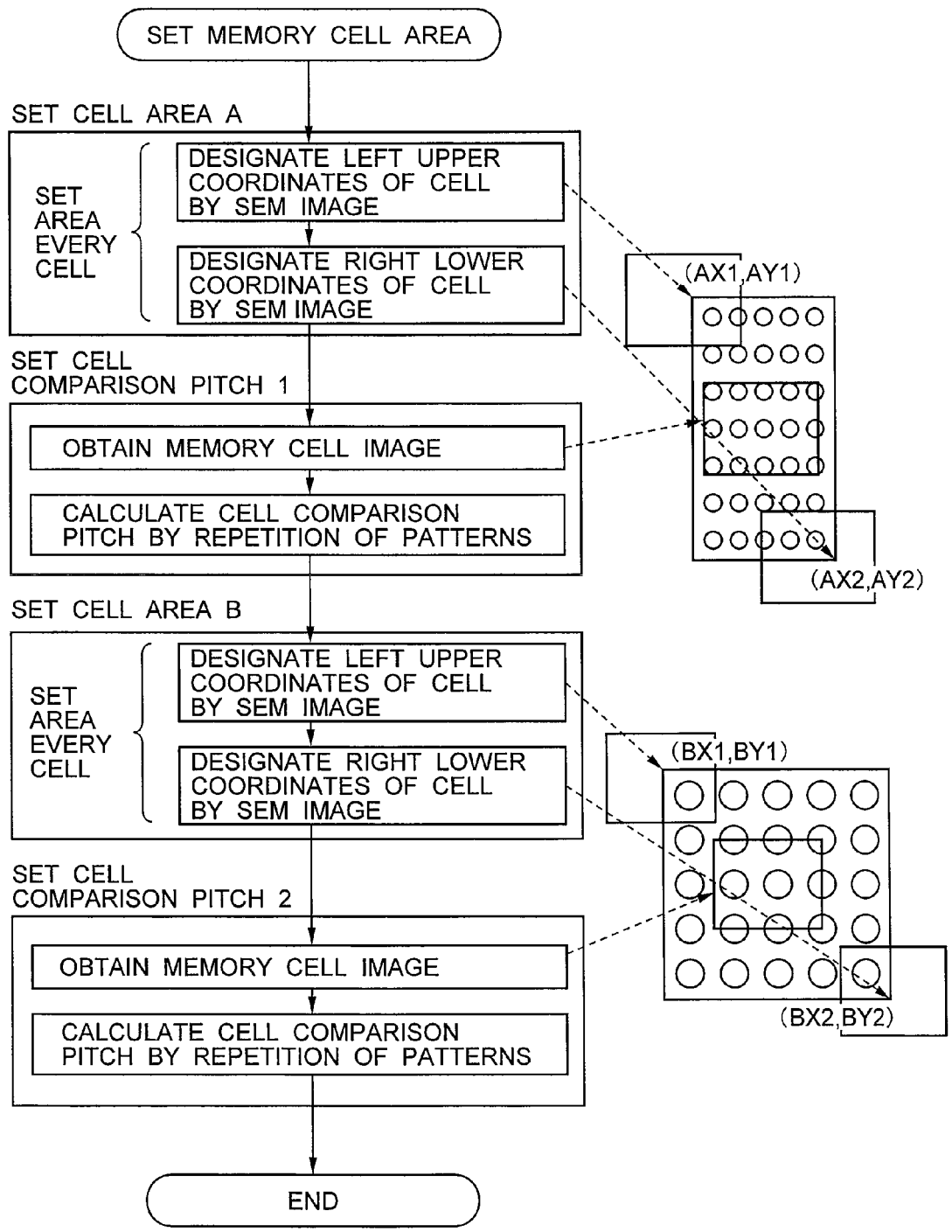
FIG. 6 is an explanatory diagram showing an example of a cell area setting process.

A setting method of the cell area will be described with reference to FIG. 6. As shown in FIG. 6, an electron beam image at the left upper corner of the cell area is obtained and coordinates of the left upper position of the cell area are determined by a mouse. Subsequently, an electron beam image at the right lower corner of the cell area is obtained and coordinates of the right lower position of the cell area are determined by the mouse. The area is determined every cell by a similar procedure. Subsequently, an electron beam image in the cell area is obtained and a pitch of the repetitive patterns on the image is calculated. By executing the above series of procedures with respect to the cell areas A and B, the cell areas and the cell comparison pitches are set. Thus, the following recipe information is formed.

Area A—cell area: left upper coordinates (AX1, AY1),
        right lower coordinates (AX2, AY2)
        cell comparison pitch: pitch 1
    Area B—cell area: left upper coordinates (BX1, BY1),
        right lower coordinates (BX2, BY2)
        cell comparison pitch: pitch 2

Figure 7A:
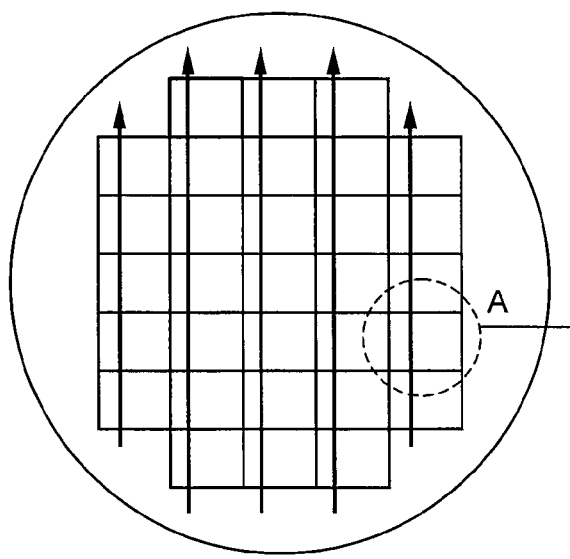
FIGS. 7A to 7C are explanatory diagrams showing the cell comparison inspecting operation.
Figure 7B:
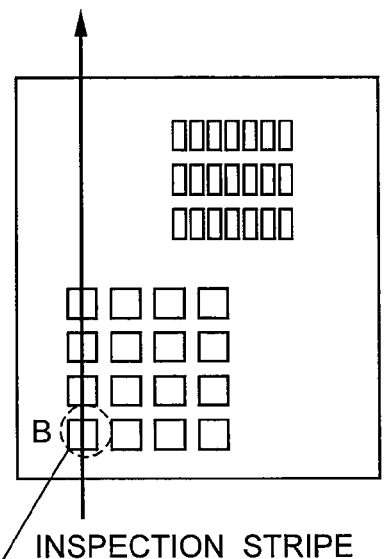
Figure 7C:
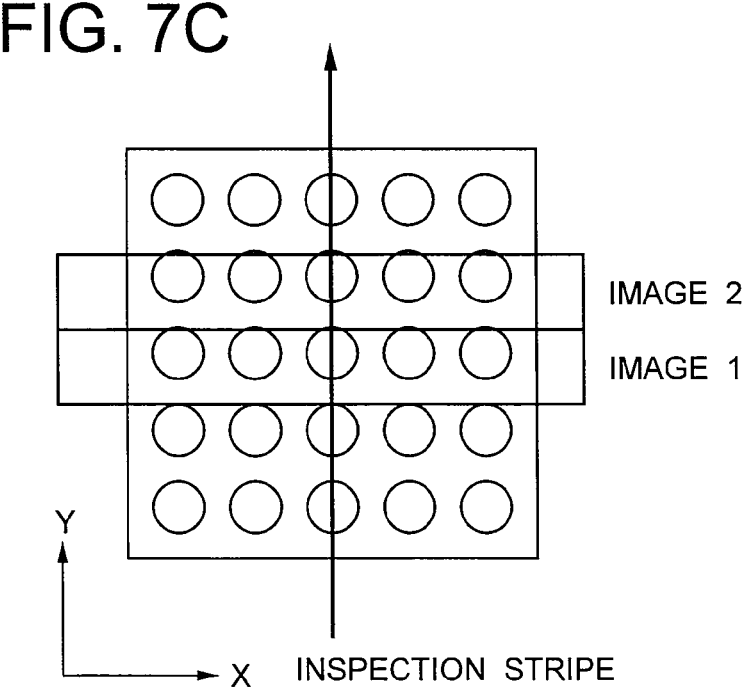

The cell comparison inspecting operation will be described with reference to FIGS. 7A to 7C. FIG. 7A is a whole schematic diagram of an inspection wafer. FIG. 7B is an enlarged schematic diagram of a chip A. FIG. 7C is an enlarged schematic diagram of a cell B.

As shown in FIGS. 7A to 7C, an attention is paid to the cell area in the chip. As shown in FIG. 7C, while the stage is moved in the Y-axial direction, the electron beam is scanned in the X direction, thereby obtaining a one-dimensional image in the X direction. Images 1 and 2 which are continuously obtained are compared at the cell comparison pitch intervals obtained before, thereby deciding coordinates of the defect position. The defect coordinates are sent to a whole control unit 49 from the defective data buffer 47.

Figure 8:
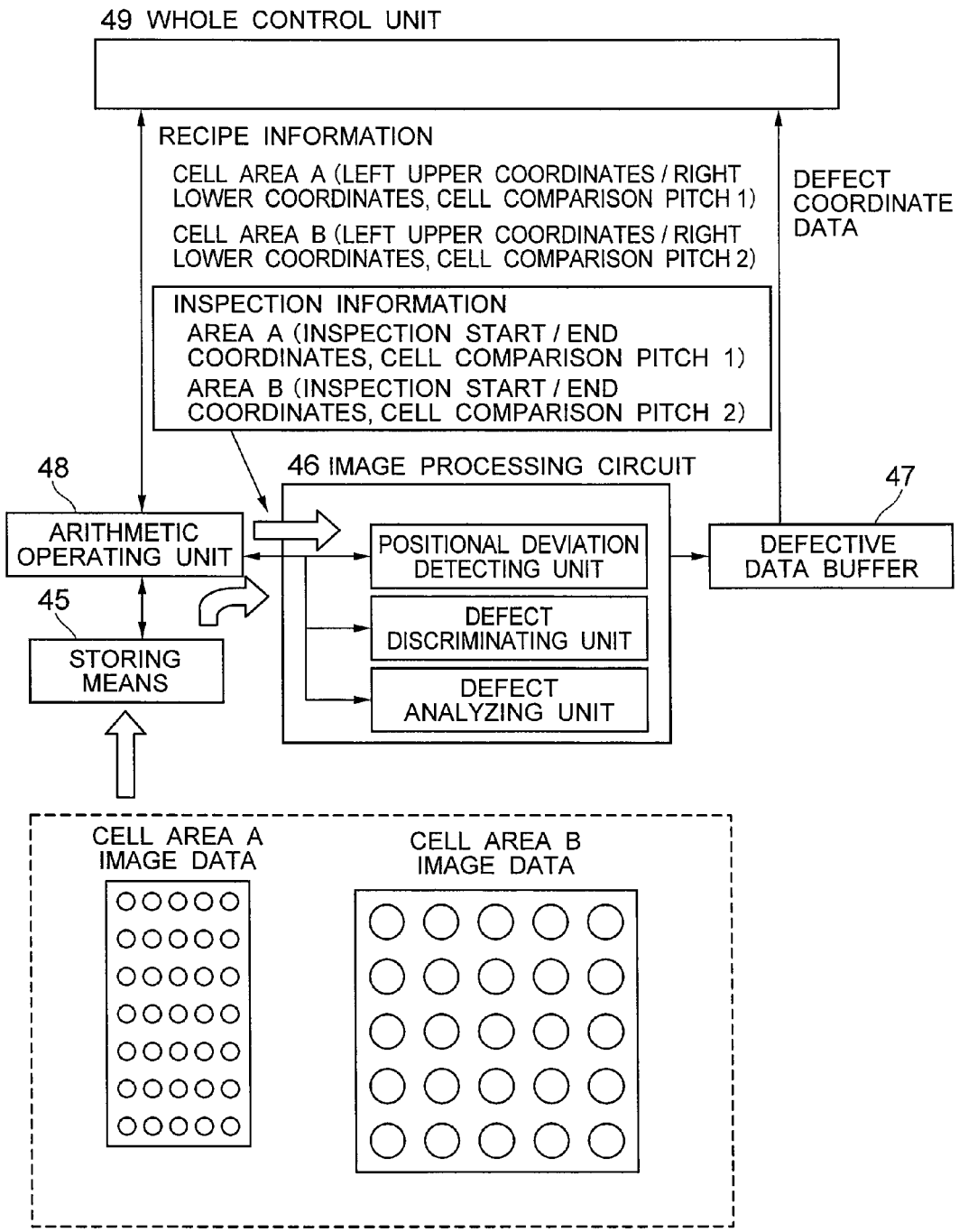
FIG. 8 is an explanatory diagram showing an example of the image comparison processing operation.

The specific image comparing operation will be described with reference to FIG. 8. First, image processes to realize the invention will be explained. The arithmetic operating unit 48 converts the recipe information which is set by the whole control unit 49 into inspection information for the image processing circuit and sets it into the image processing circuit 46 (a positional deviation detecting unit, a defect discriminating unit, a defect analyzing unit). The one-dimensional image data which is continuously obtained while moving the stage is transferred to the image processing circuit through the storing means 45. While obtaining the image data from the storing means 45 in accordance with the inspection information, the image processing circuit 46 executes the cell comparing process and decides the defect coordinates and defective data. The decided defective data is accumulated in the defective data buffer.

The information of the inspection area includes start/end coordinates and the cell comparison pitch of each cell inspection area. If two cell areas exist as shown in FIG. 5, the start/end coordinates and the cell comparison pitch of each cell inspection area of each of the cell areas A and B are sent to the arithmetic operating unit 48 from the whole control unit 49. Further, they are converted into inspection area information for the image processing circuit and sent to the positional deviation detecting unit and the defect discriminating unit. The comparison inspection of the image data which is sent from the storing means 45 is executed.

Figure 9:
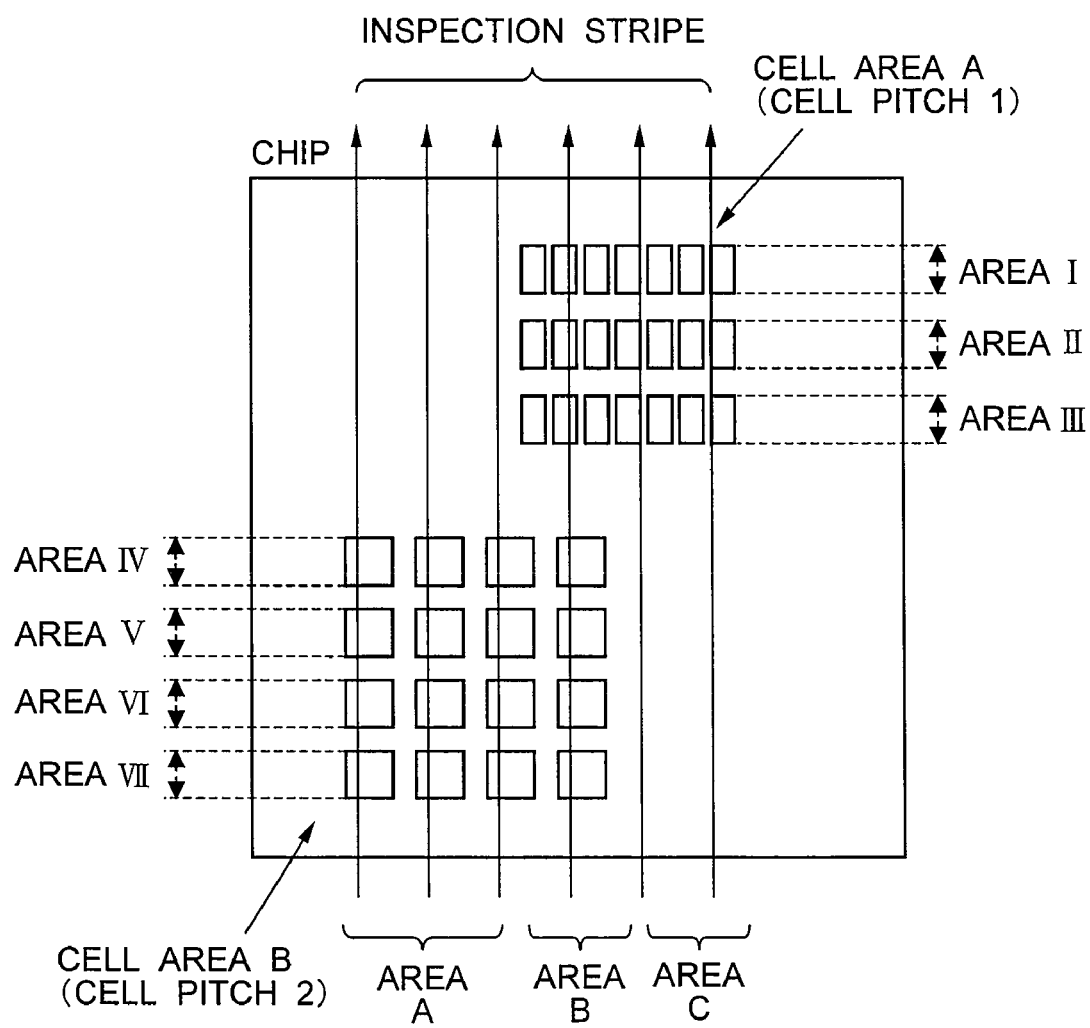
FIG. 9 is an explanatory diagram of the plural-cell area inspecting operation.

The cell comparison inspecting operation in the case where a plurality of cell areas overlap will be described with reference to FIG. 9. As shown in FIG. 9, in the case of executing stripe inspection in the chip, cell comparison areas differ every area as shown below.

Area A: cell comparison inspection areas IV/V/VI/VII
    Area B: cell comparison inspection areas I/II/III/IV/V/VI/VII
    Area C: cell comparison inspection areas I/II/III The cell comparison inspection areas of the different cell comparison pitches mixedly exist in the area B and the inspection area information which is sent from the arithmetic operating unit 48 to the image processing circuit 46 is as follows.

Inspection Area Information

| Area I | (inspection start/end coordinates, cell comparison pitch 1) |
| --- | --- |
| Area II | (inspection start/end coordinates, cell comparison pitch 1) |
| Area III | (inspection start/end coordinates, cell comparison pitch 1) |
| Area IV | (inspection start/end coordinates, cell comparison pitch 2) |
| Area V | (inspection start/end coordinates, cell comparison pitch 2) |
| Area VI | (inspection start/end coordinates, cell comparison pitch 2) |
| Area VII | (inspection start/end coordinates, cell comparison pitch 2) |

In this case, a difference between the inspection start coordinates is discriminated, the cell comparison pitch is changed on the way of the stripe, and the comparison inspection can be executed at the corresponding cell comparison pitch every cell comparison inspection area.

Figure 10:
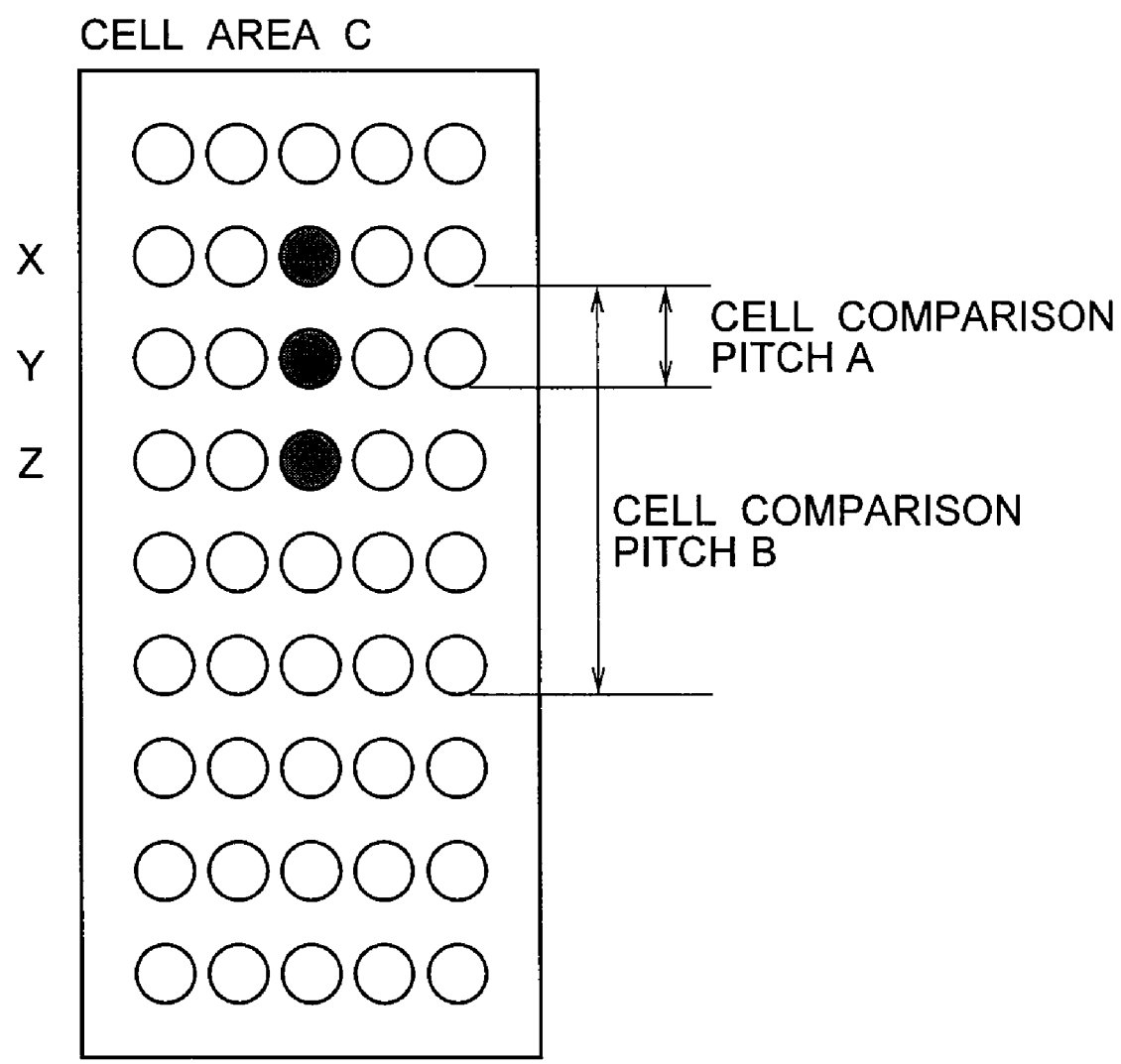
FIG. 10 is an explanatory diagram of the inspecting operation according to different cell comparison pitches.

The inspecting operation in the case where the cells are compared at the different cell comparison pitches will now be described with reference to FIG. 10. In FIG. 10, in the case where the images in X, Y, and Z areas at the cell comparison pitch A, although a black dot in the Y area indicates a defect, if the defects of the black dots also exist in both of the images in the X and Z areas as adjacent images to be compared, when the image in the Y area is compared with the images in the adjacent areas, they are the same image. Therefore, such a black dot is not determined to be the defect and is missed. However, when the comparison inspection is executed at a cell comparison pitch B different from the cell comparison pitch A (that is, the cell comparison pitch which is integer times as large as the cell comparison pitch A), since there are no defects in the images to be compared, the black dot in the Y area is determined to be the defect. By making the comparison inspection at the different comparison pitches, detecting precision is improved.

In the case of inspecting one cell area by using the two different cell comparison pitches A and B, the following two cell comparison pitches are set into the recipe information which is sent from the whole control unit 49 to the arithmetic operating unit 48.

Cell area C: left upper coordinates (CX1, CY1), right lower coordinates (CX2, CY2)
cell comparison pitches: pitch A, pitch B As mentioned above, according to the embodiment, the inspecting method and inspection apparatus for inspecting the circuit patterns with a high time efficiency can be provided by having the display screen for setting the cell areas of the different cell comparison pitches and having the function of inspecting the cell areas of the different cell comparison pitches.

The second embodiment of the invention will now be described with reference to the drawings.

Figure 11:
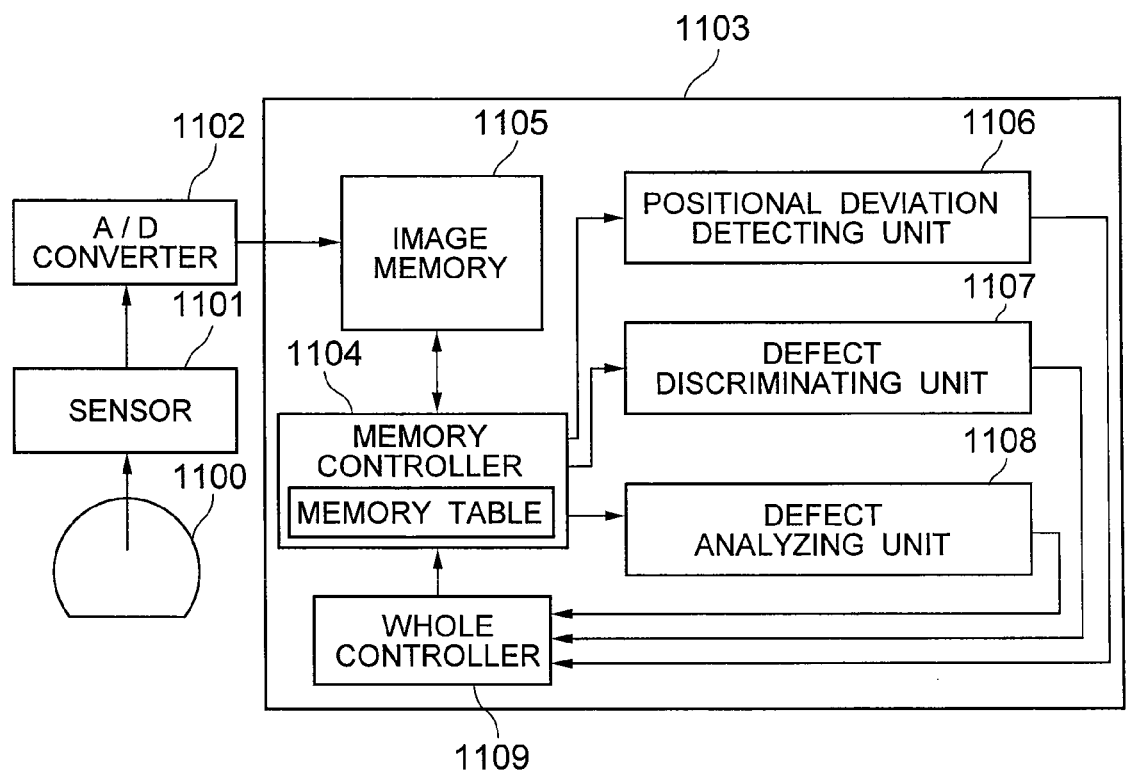
FIG. 11 is a functional block diagram of an external appearance inspection apparatus of a semiconductor wafer according to the invention.

FIG. 11 is a functional block diagram of an external appearance inspection apparatus of a semiconductor wafer according to the invention. An external appearance of a semiconductor wafer 1100 as an inspection object is photographed by a sensor 1101. The photographed image is converted into digital image data by an A/D converter 1102 and the digital image data is stored into the image memory 1105 of an image processing unit 1103. As functions constructing the image processing unit 1103, besides the image memory 1105, there are the following component elements: a positional deviation detecting unit 1106 to calculate a positional deviation amount between the two image data to be compared; a defect discriminating unit 1107 to obtain a differential image between the two images by using the positional deviation amount calculated by the positional deviation detecting unit and extract defect candidates from the differential image; the defect analyzing unit 1108 to analyze the images extracted as defect candidates in more details; a memory controller 1104 to control a memory for storing the image data; and a whole controller 1109 to control the whole operation.

Figure 15:
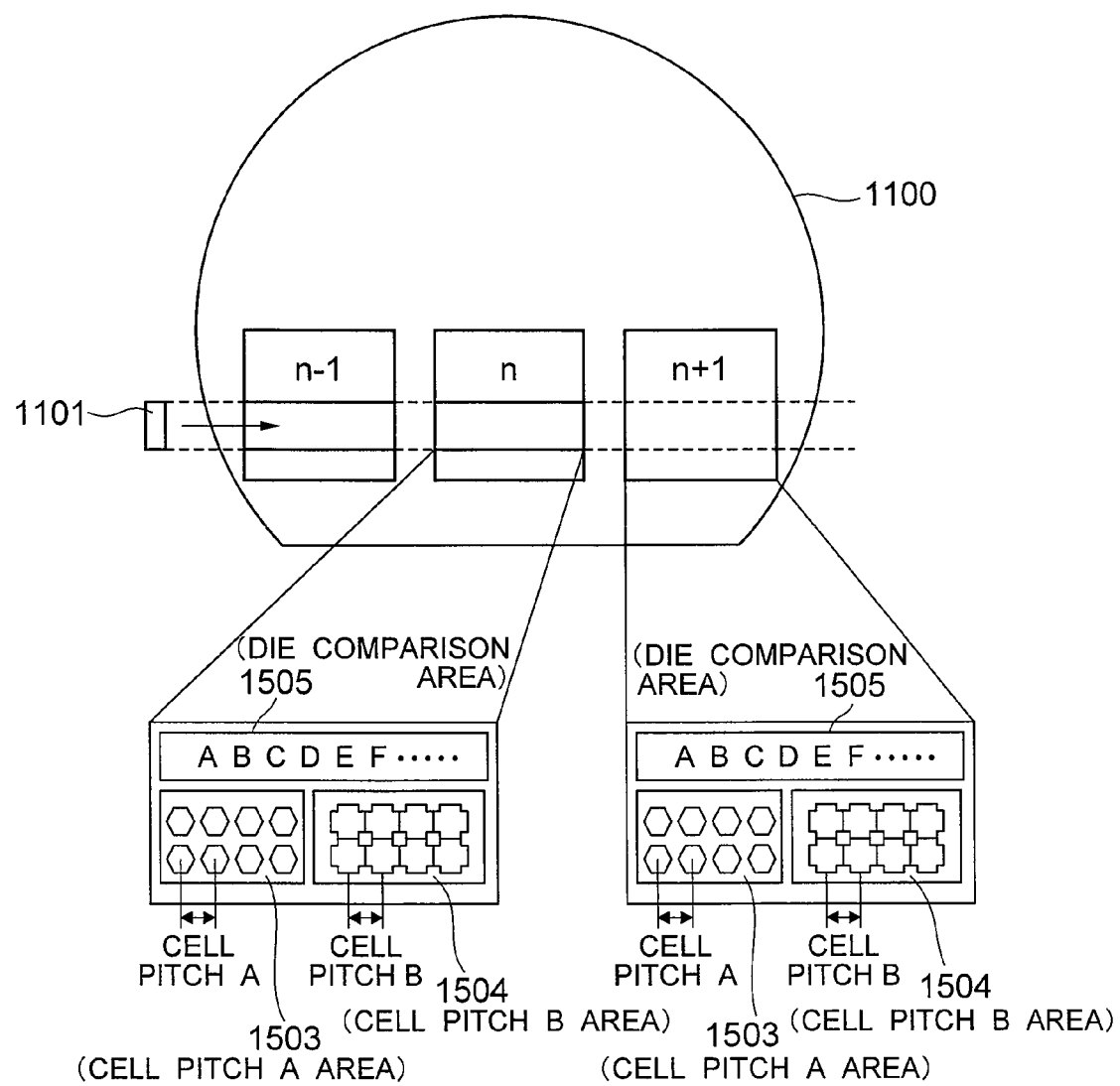
FIG. 15 is a schematic plan view of the semiconductor wafer.
Figure 16A:
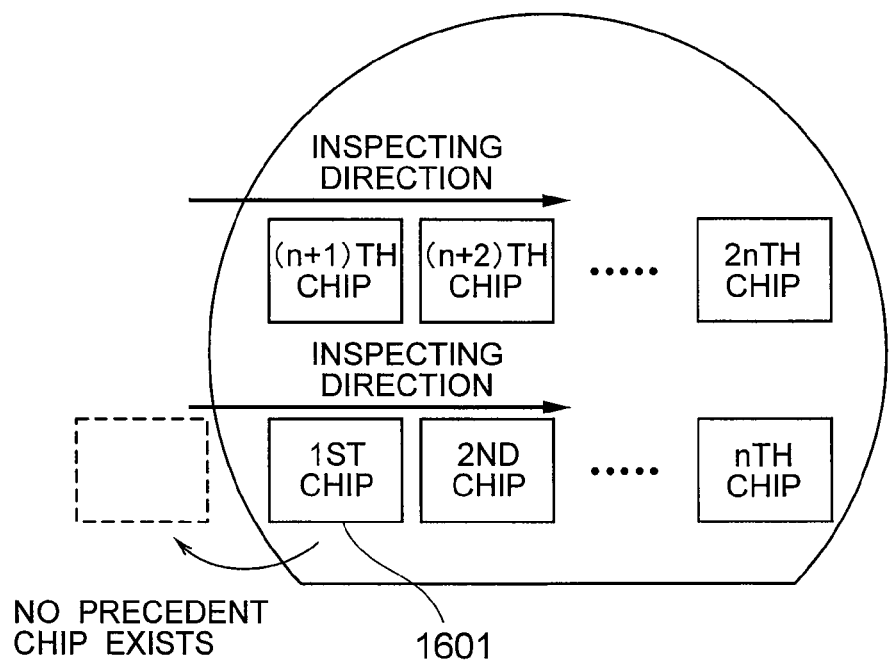
FIGS. 16A and 16B are schematic plan views of the semiconductor wafers.
Figure 16B:
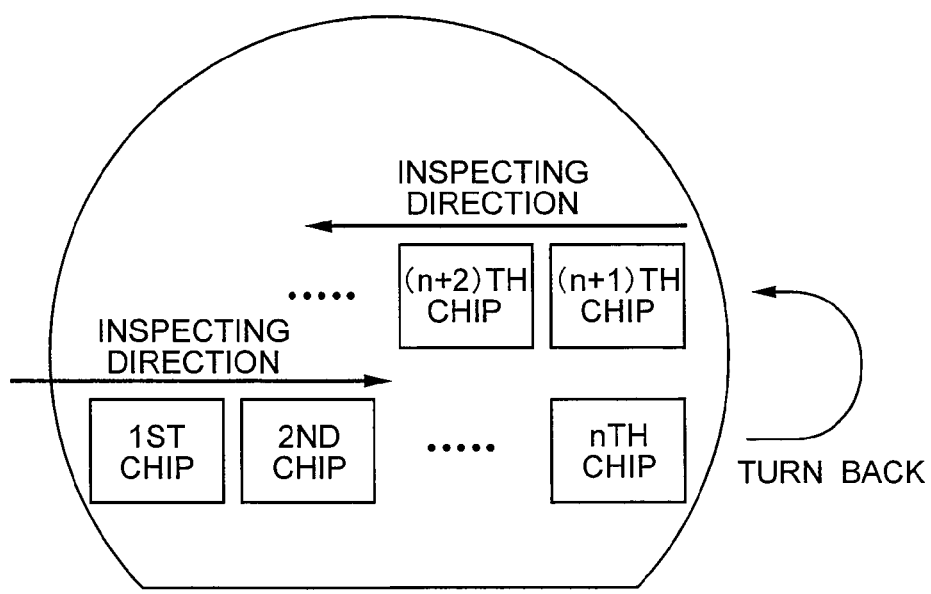
Figure 17:
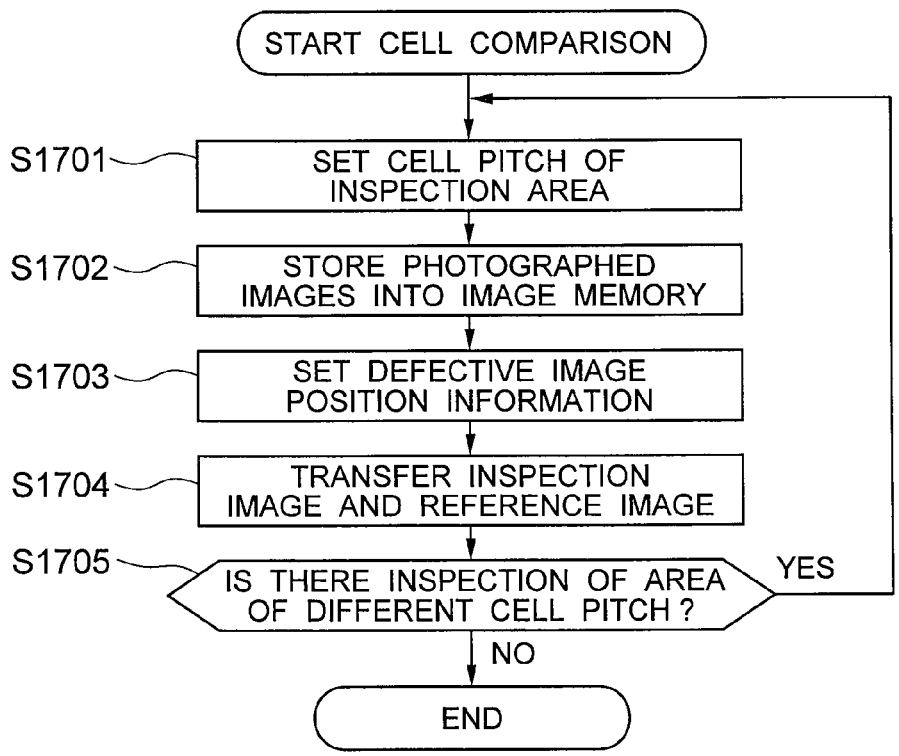
FIG. 17 is a conventional cell comparison flowchart.

The whole controller 1109 plays a role for collecting information of each of the positional deviation detecting unit 1106, defect discriminating unit 1107, and defect analyzing unit 1108 and distributing the necessary information to the necessary portions and plays an integrated role for monitoring an operating situation of each of the above functions. Further, the whole controller 1109 holds: layout information of the chips on the wafer; information regarding the comparison system of the inspection images in each area in the chip (information showing which area in the chip is the die comparison area, information showing which area is the cell comparison area of the cell pitch A, information showing which area is the cell comparison area of the cell pitch B, and the like: refer to FIG. 15); information regarding the obtaining method of the reference image in the case where the defect has been detected in the chip in the edge portion of the wafer in the die comparison; and the like. The layout information of the chips on the wafer and the information regarding the comparison system of the inspection images in each area in the chip are set by a method whereby it is obtained from the design information or the user observes the wafer. As an obtaining method of the reference image in the case of the die comparison, for example, the chip which is one-chip precedent to the inspection image is ordinarily designated as a reference image and if the chip exists in the wafer edge portion and no precedent chip exists like the first chip or the (n+1)th chip as shown in FIG. 16A or 16B, the chip which is one-chip subsequent to the inspection image is designated as a reference image. The obtaining method of the reference image can be set as a default into the whole controller or can be set by the user.

In the positional deviation detecting unit 1106, a correlation value between the reference image and the inspection image serving as two images to be compared is obtained and the deviation amount between the two images is calculated. A method such as SEM type, optical type, or the like has been known as a method of photographing the circuit patterns of the semiconductor wafer. For example, in the case of the SEM type external appearance inspection apparatus, there is a case where the electron beam is curved due to the charging of the semiconductor wafer and an error occurs in the relation between the obtained image and the position information. In the case of the comparison inspection, it is necessary to accurately match the comparing positions of both images to be compared. In the positional deviation detecting unit 1106, deviation amounts in the X and Y directions of the two images to be compared are calculated by a correlation arithmetic operation or the like and the deviation amount information is sent to the defect discriminating unit 1107. In the defect discriminating unit 1107, the deviation amounts provided from the positional deviation detecting unit are applied to the inspection image, the positional deviation is corrected, thereafter, the differential image between the inspection image and the reference image is obtained, the defect is extracted, and a feature amount of the defect is calculated. As a feature amount of the defect, coordinates of the center of the defective image, its area, or the like is obtained.

To analyze the defect extracted by the defect discriminating unit 1107, the memory controller 1104 extracts the image data (inspection image) in the defect position and the reference image from the image memory 1105 and transfers them to the defect analyzing unit 1108. As for the extracting position of the inspection image which is transferred from the image memory 1105 to the defect analyzing unit 1108, on the basis of the center coordinates and the area of the defect as an arithmetic operation result of the defect discriminating unit 1107, the whole controller 1109 calculates the position in the image memory 1105 of the image necessary for the defect analysis and sets it into the memory controller 1104. At this time, the data which is set into the memory controller 1104 is a memory address showing the position of the read-out data and, in the case where the inside of the memory is managed on a chip unit basis, it is a chip address and an address in the chip. On the basis of the set position information and the like, the memory controller 1104 reads out the data from the image memory 1105 and transfers it to the defect analyzing unit 1108. As transfer data to the defect analyzing unit, the inspection image and the reference image are transferred as a pair, there is a case where the relative position of the reference image to the inspection image and the comparison system differ depending on the conditions.

Figure 12:
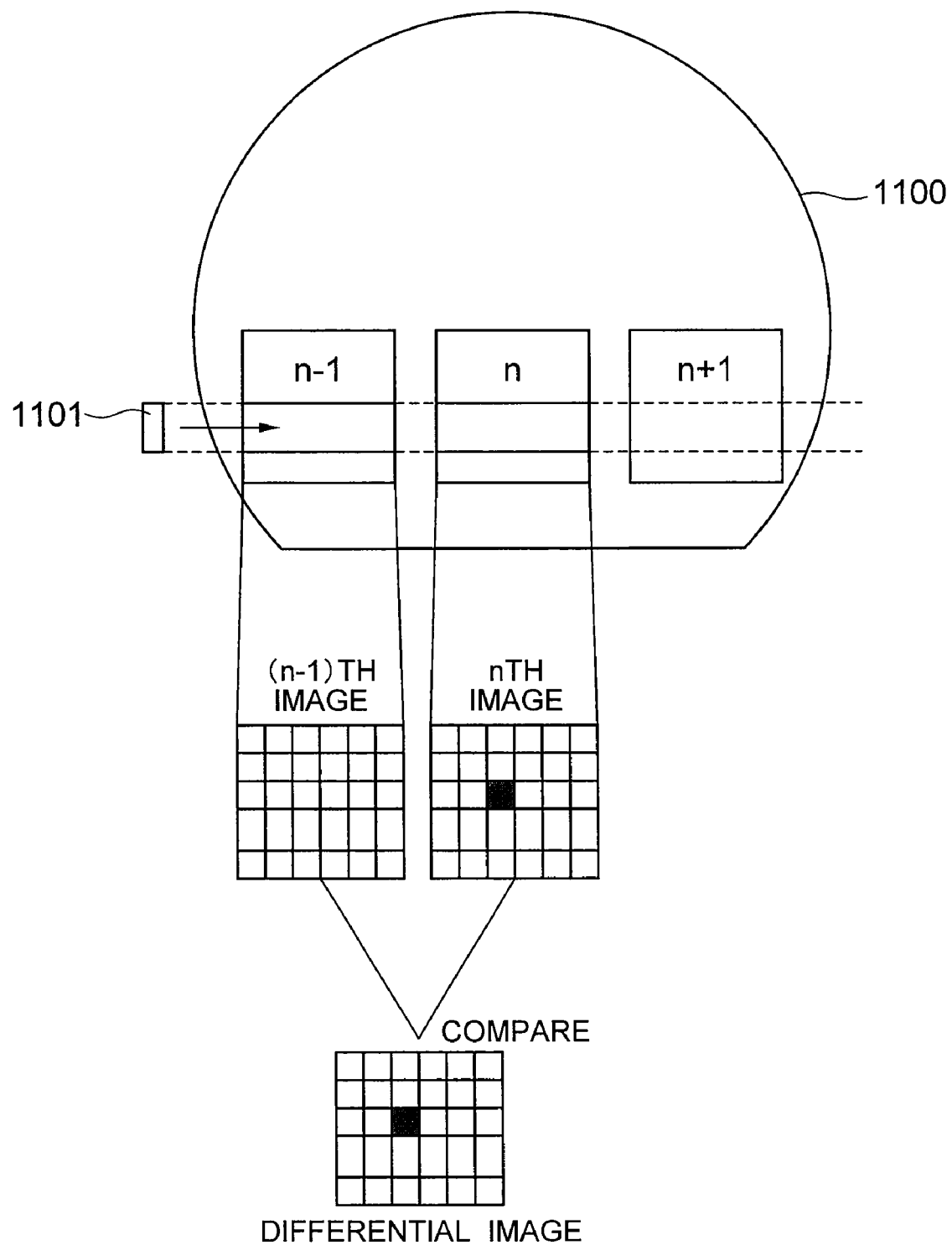
FIG. 12 is a schematic plan view of the semiconductor wafer.
Figure 13:
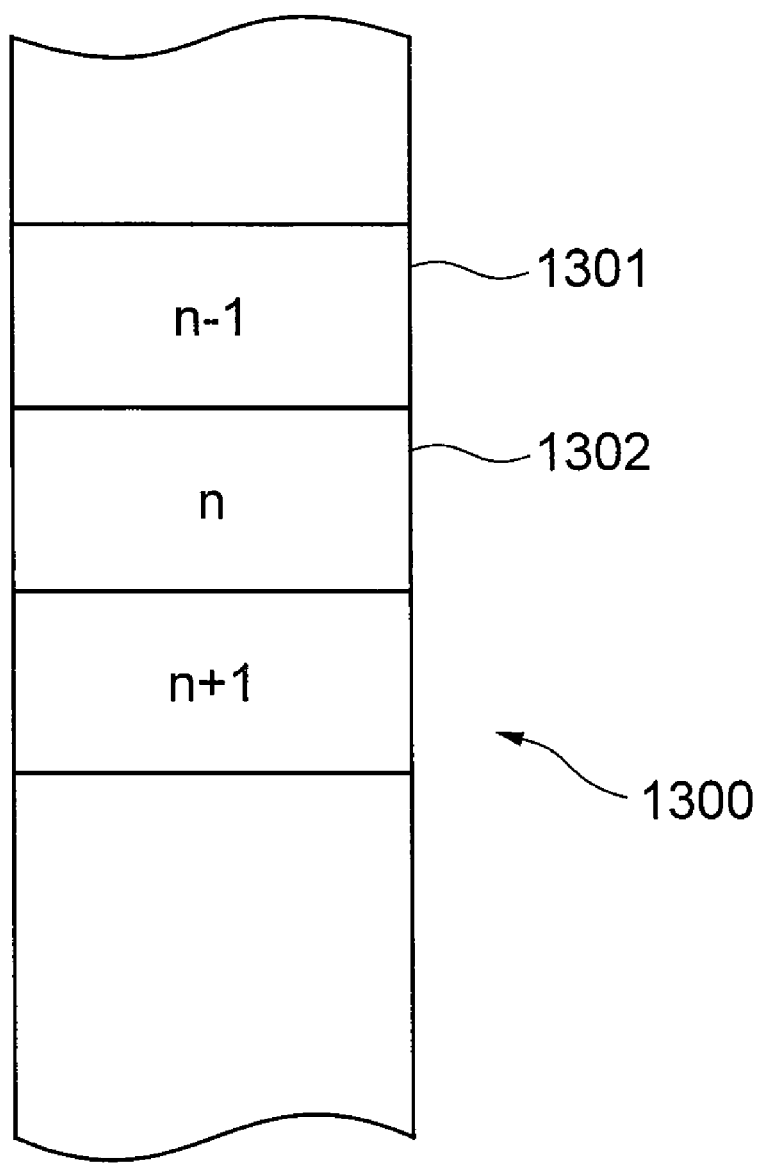
FIG. 13 is a map diagram in an image memory.

FIG. 12 is a schematic plan view of the semiconductor wafer as an inspection target. FIG. 13 is a map diagram in the image memory when the image data obtained by photographing the wafer of FIG. 12 has been stored in the image memory. After the circuit patterns of the semiconductor wafer 1100 shown in FIG. 12 were photographed, the image data transferred to the image processing unit is stored in the image memory on a chip unit basis. For example, the image data obtained by scanning and photographing the surface of the (n−1)th chip in FIG. 12 is stored in an (n−1)th image area 1301 on a memory map 1300 in FIG. 13. The image data obtained by scanning and photographing the nth chip In FIG. 12 is sequentially stored in an nth image area 1302 on the memory map 1300 in FIG. 13.

In order to realize such a construction that each image processing function unit of the positional deviation detecting unit 1106, defect discriminating unit 1107, and defect analyzing unit 1108 executes the process and performs each of the functions and the functions as a whole apparatus are efficiently pipelined and executed, the image data stored in the image memory 1105 has to be provided to each image processing function unit at necessary timing. The memory controller 1104 controls so that the desired image data in the image data stored in the image memory 1105 on a chip unit basis as mentioned above is provided at timing when the three image processing function units optimally and efficiently operate.

Figure 14:
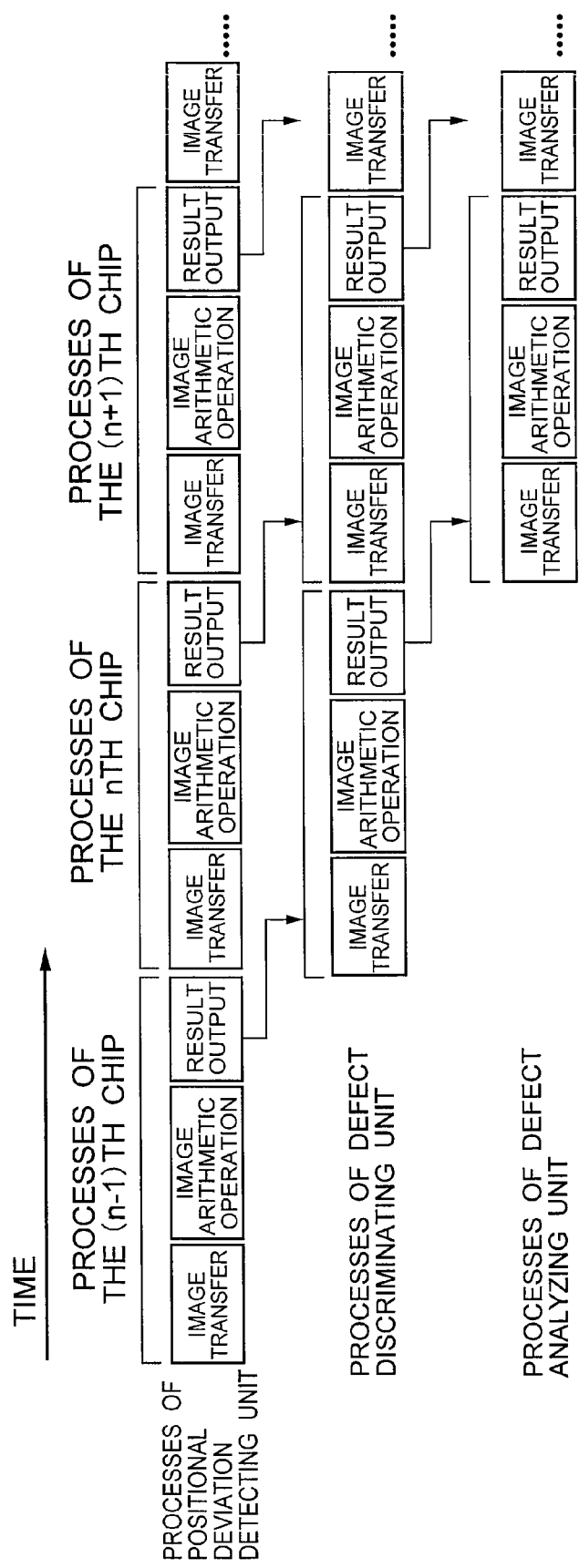
FIG. 14 is a flowchart for the image processing operation.

FIG. 14 shows a flow in which the image data stored in the image memory on a chip unit basis is transferred to each image processing function unit and processed therein.

The image data of the (n−1)th chip stored in the image memory 1105 is first transferred to the positional deviation detecting unit 1106 from the memory controller 1104, a deviation amount is calculated by an arithmetic operating process, and its result is transferred to the defect discriminating unit 1107. In the positional deviation detecting unit 1106, after completion of the arithmetic operating process of the (n−1)th chip, the image data of the nth chip serving as a next arithmetic operation target is transferred, the arithmetic operating process is executed, and its result is again transferred to the defect discriminating unit 1107. In the positional deviation detecting unit, the above operation is sequentially repeated.

Subsequently, in the defect discriminating unit 1107, the image data of the (n−1)th chip is transferred from the image memory 1105 at timing for receiving the deviation amount as an arithmetic operation result of the (n−1)th chip from the positional deviation detecting unit 1106, and a defect discrimination processing arithmetic operation is executed. In the defect discriminating unit 1107, after completion of the arithmetic operating process of the (n−1)th chip, in order to execute the arithmetic operating process of the next nth chip, the image data of the nth chip and the deviation amount from the positional deviation detecting unit 1106 are transferred and the defect discriminating process of the nth chip is executed. In the defect discriminating unit 1107, the above operation is sequentially repeated.

Further, on the basis of the information (center coordinates, area) of the portion detected as a defect by the defect discriminating unit 1107, only the image of this portion is now extracted from the image memory 1105 and transferred to the defect analyzing unit 1108, and the defect analyzing process is executed. As mentioned above, with respect to the positional deviation detecting unit 1106 and the defect discriminating unit 1107 among the three image processing function units, since the image processing arithmetic operation is executed to all of the photographed images, all of the image data stored in the image memory 1105 is sequentially transferred and the image arithmetic operations are executed. However, in the defect analyzing unit 1108, only the images extracted as defects from the image processing arithmetic operation result of the defect discriminating unit 1107 are transferred from the image memory 1105 and the defect analyzing process is executed.

Therefore, the position information of the defective images detected from the arithmetic operation result of the defect discriminating unit 1107 is sent to the memory controller 1104 through the whole controller 1109. On the basis of the position information, the desired image data is transferred to the defect analyzing unit 1108. In the case of the die comparing process, for the inspection image, the reference image is compared with the images of the adjacent chips. Therefore, the data at the same address position of the different chips is transferred to the defect analyzing unit 1108. For example, if the defect is detected in a die comparison area 1505 of the (n+1)th chip in FIG. 15, the inspection image is compared with the image data at the same position (same address) of the nth chip. In the case of the cell comparison, for the inspection image, the reference image is compared with the adjacent cells. Therefore, as transfer data to the defect analyzing unit, the image data at the positions which are away from each other by the distance of the cell pitch in the same chip is transferred.

Figure 19A:
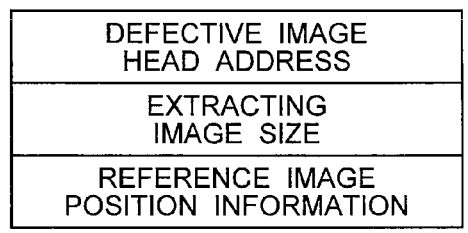
FIGS. 19A to 19C are explanatory diagrams showing an example of a die comparison inspection according to the invention.
Figure 19B:
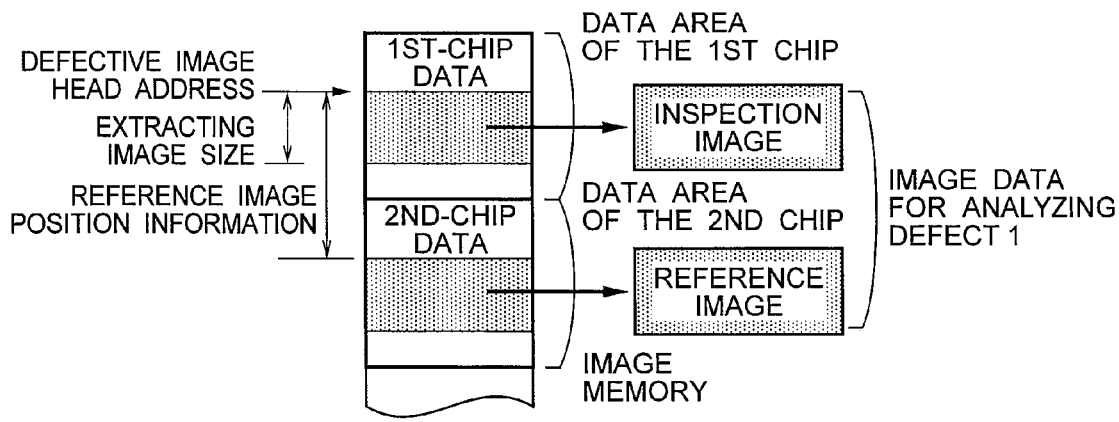
Figure 19C:
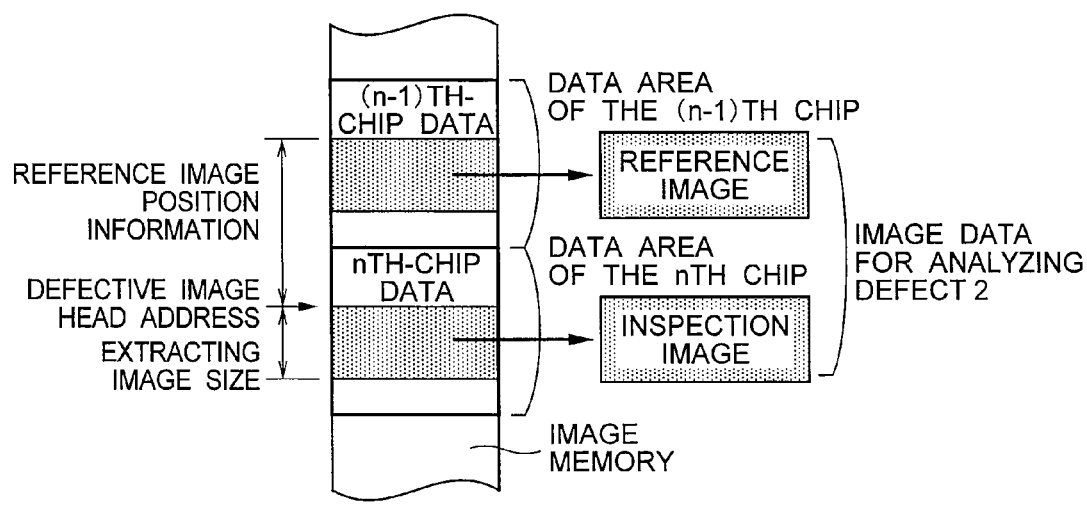

FIGS. 19A to 19C are explanatory diagrams showing an example of a die comparison inspection according to the invention. FIG. 19A is a diagram showing an example of information which is set into the memory table in the memory controller 1104 by the whole controller 1109. Sets each comprising a defective image head address, an extracting image size, and reference image position information of the number corresponding to the number of defects are set into the memory table in the memory controller every defect. The whole controller 1109 sets the defective image head address and the extracting image size on the basis of the information obtained from the defect discriminating unit 1107. The whole controller 1109 sets the reference image position information on the basis of the layout information of the chips on the wafer and the information regarding the obtaining method of the reference image. As an obtaining method of the reference image at the time of the die comparison, explanation will be made on the assumption that the setting has been made in such a manner that the chip which is one-chip precedent to the inspection image is generally used as a reference image, and in the case where the chip in which the defect has been detected exists in the wafer edge portion and no precedent chip exists, the chip which is one-chip subsequent to the inspection image is used as a reference image.

FIG. 19B is an explanatory diagram showing the positional relation between the inspection image and the reference image which are extracted from the image memory 1105 by the memory controller 1104 when a defect 1 is detected in the first chip locating in the wafer edge portion. At this time, a code indicative of the one-chip subsequent chip has been written in the portion of the reference image position information in FIG. 19A by the whole controller 1109. Thus, the memory controller 1104 extracts the image, as an inspection image, of the size designated by the extracting image size from the defective image head address of the first chip designated by the memory table from the image memory. On the basis of the reference image position information, the image of the same size is extracted as a reference image from the same chip address of the data of the second chip. The extracted inspection image and reference image are transferred to the defect analyzing unit 1108 from the memory controller 1104.

In the die comparison inspection, the image data which is one-chip precedent is generally used as a reference image for the inspection image. However, according to the invention, in addition to the position information of the inspection image, the position information of the reference image can be set. According to the conventional method of designating the one-chip precedent chip as a reference image if the defect was detected in the first chip, since the one-chip precedent image serving as a reference image does not exist, the defect analysis cannot be performed. However, according to the invention, as a reference image of the defective image of the first chip, the second chip can be set into the reference image position information so as to be read out as a reference image from the image memory.

FIG. 19C is an explanatory diagram showing the positional relation between the inspection image and the reference image which are extracted from the image memory 1105 by the memory controller 1104 when a defect 2 is detected in the nth chip which is not located in the wafer edge portion. At this time, a code indicative of the one-chip precedent chip has been written in the portion of the reference image position information in FIG. 19A by the whole controller 1109. Thus, the memory controller 1104 extracts the image, as an inspection image, of the size designated by the extracting image size from the defective image head address of the nth chip designated by the memory table from the image memory 1105. On the basis of the reference image position information, the image of the same size is extracted as a reference image from the same chip address of the data of the (n−1)th chip which is one-chip precedent. The extracted inspection image and reference image are transferred to the defect analyzing unit 1108 from the memory controller 1104.

Figure 20A:
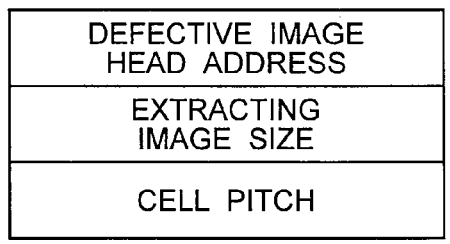
FIGS. 20A and 20B are explanatory diagrams showing an example of a cell comparison inspection according to the invention.
Figure 20B:
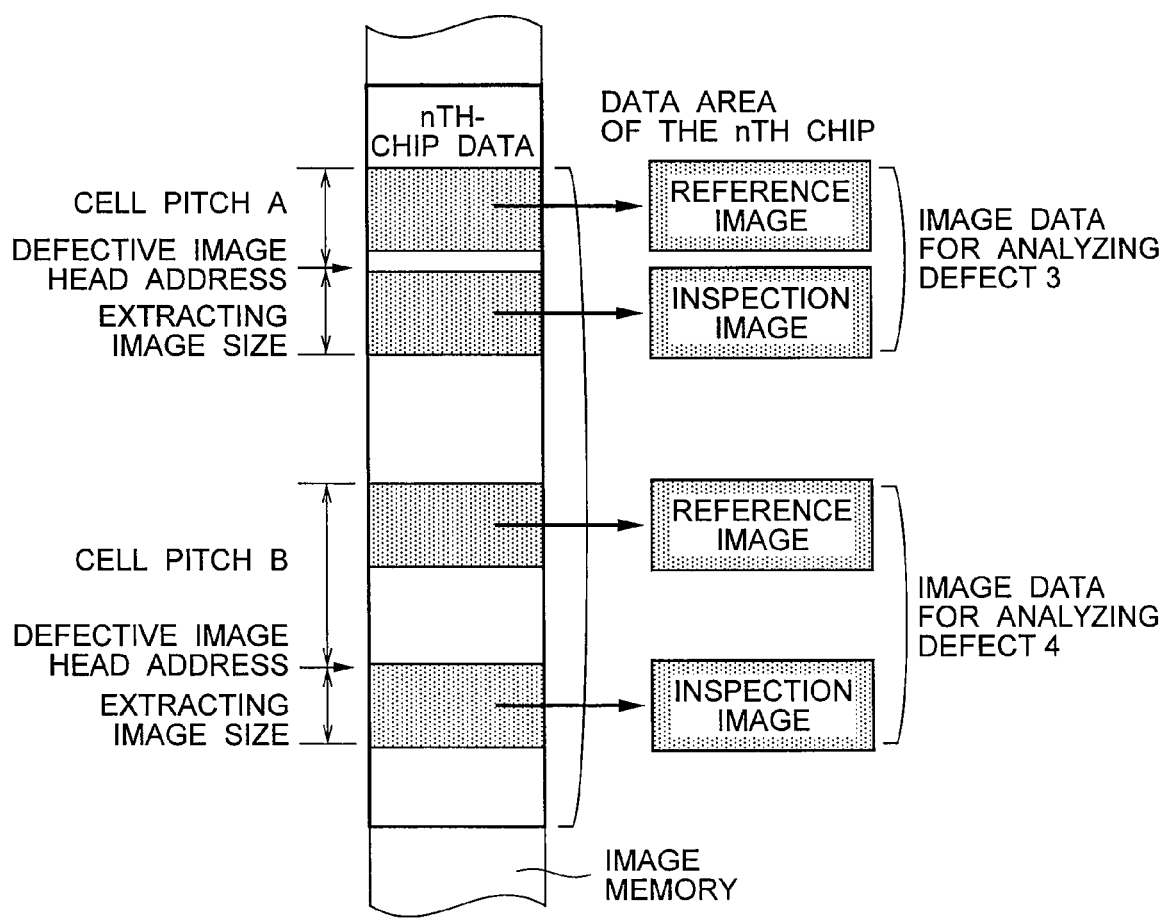

According to the invention, also at the time of the cell comparison, the position of the reference image for the inspection image can be given by a unit of the cell pitch in a manner similar to the die comparison. FIGS. 20A and 20B are explanatory diagrams showing an example of a cell comparison inspection according to the invention.

FIG. 20A is a diagram showing an example of information which is set into the memory table in the memory controller 1104 by the whole controller 1109. Sets of information comprising the defective image head address, extracting image size, and cell pitch of the number as many as the number of defects are set into the memory table in the memory controller every defect. The whole controller 1109 sets the defective image head address and the extracting image size on the basis of the information obtained from the defect discriminating unit 1107. The whole controller 1109 sets the cell pitch by collating the detected defect position with the information regarding the comparing method of the inspection image in each area in the chip. Explanation will be made here on the assumption that a defect 3 exists in the area of the cell pitch A and a defect 4 exists in the area of the cell pitch B. In this case, the cell pitch is set to A with respect to the defect 3 and the cell pitch is set to B with respect to the defect 4.

FIG. 20B is an explanatory diagram showing the relations between the inspection image and the reference image of the defect 3 and the inspection image and the reference image of the defect 4 which are extracted from the image memory 1105 by the memory controller 1104 on the basis of the information in the memory table shown in FIG. 20A.

With respect to the defect 3, the memory controller 1104 extracts the image, as an inspection image, of the size designated by the extracting image size from the defective image head address designated by the memory table from the image memory. It also extracts the image, as a reference image, of the same size from the address which is precedent by the cell pitch A. The extracted inspection image and reference image are transferred to the defect analyzing unit 1108 from the memory controller 1104.

With respect to the defect 4, the memory controller 1104 extracts the image, as an inspection image, of the size designated by the extracting image size from the defective image head address designated by the memory table from the image memory. It also extracts the image, as a reference image, of the same size from the address which is precedent by the cell pitch B. The extracted inspection image and reference image are transferred to the defect analyzing unit 1108 from the memory controller 1104.

As described in FIGS. 19A to 20B, according to the invention, the reading position of the reference image from the image memory can be set every inspection image. When the defect is detected from the chip in the wafer edge portion, by setting the reference image to the chip different from the ordinary setting, the defect analysis by the die comparison can be performed to the chip in the edge portion. Also in the cell comparison, similarly, even if the defect was extracted for the image area of the different cell pitch, by enabling the cell pitch to be set every defective image which is read out, even in the case where the defect of the different cell pitch area is detected, the image transfer to the defect analyzing unit is continuously executed.

Figure 18:
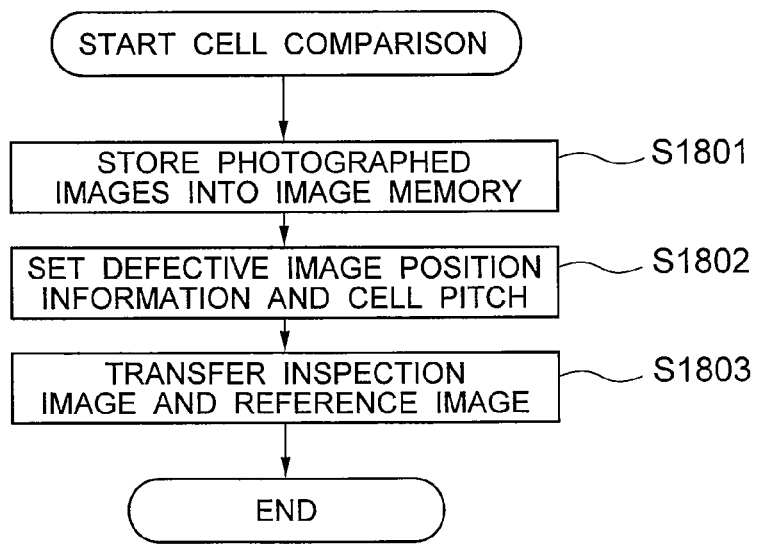
FIG. 18 is a cell comparison flowchart according to the invention.

FIG. 18 is a cell comparison flowchart according to the invention. First, the image photographed by the sensor is stored into the image memory 1105 (S1801). Subsequently, a defect discrimination is made by the defect discriminating unit 1107 and the defect information is sent to the whole controller 1109. In the whole controller 1109, the cell pitch is determined every defective image from the defect position in the chip and the extracting position of the inspection image and the reference image position information are set into the memory table of the memory controller 1104 (S1802). The memory controller 1104 extracts the inspection image and the reference image from the image memory 1105 in accordance with the information set in the memory table and transfers them to the defect analyzing unit 1108 (S1803). As mentioned above, according to the invention, even if the defect was detected in the area of the different cell pitch, all defects can be inspected by the one operation.

Figure 21A:
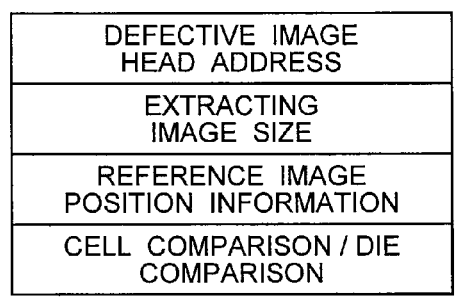
FIGS. 21A and 21B are explanatory diagrams showing an example of a mixture inspection of the cell comparison inspection and the die comparison inspection according to the invention.
Figure 21B:
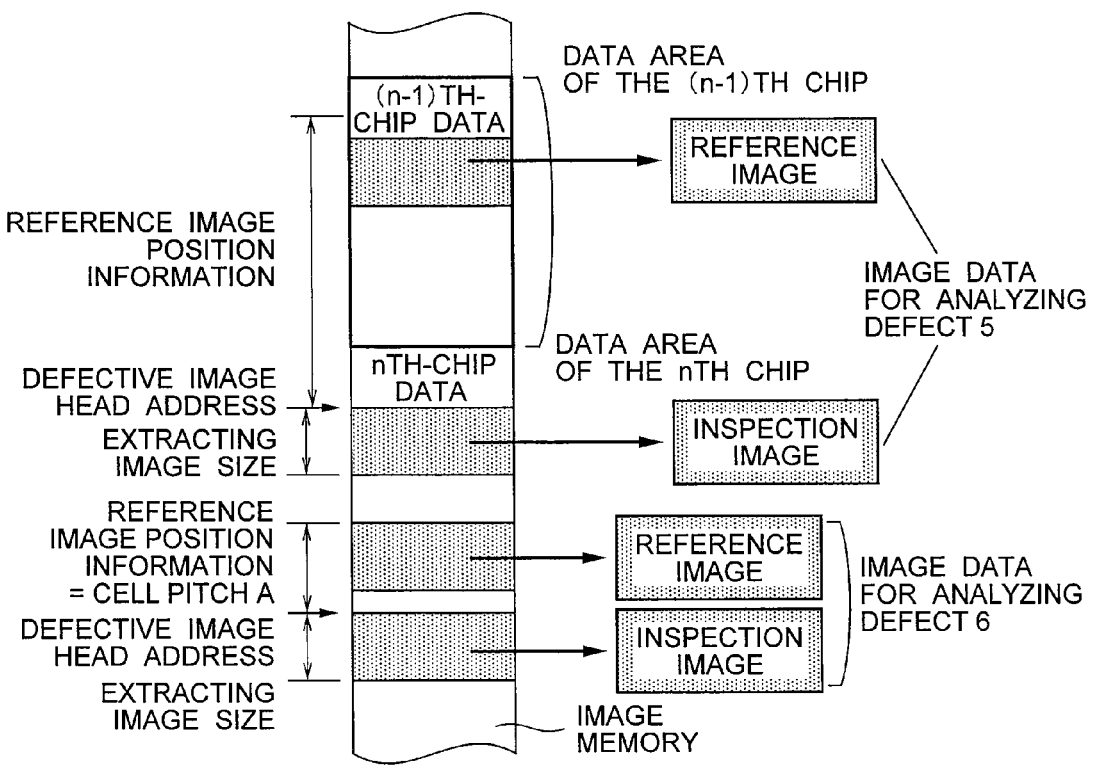

FIGS. 21A and 21B are explanatory diagrams showing an example of a mixture inspection of the cell comparison inspection and the die comparison inspection according to the invention. According to the invention, in addition to the position information of the defective image and the relative position information of the reference image for the inspection image, information to identify whether the image is the image for the die comparison or the image for the cell comparison is provided and the reference image position at the time of reading out of the image memory is set every defective image, so that the cell comparison and the die comparison can be mixedly executed.

FIG. 21A is a diagram showing an example of the information which is set into the memory table in the memory controller by the whole controller 1109 in this case. Sets of the information comprising the defective image head address, extracting image size, reference image position information, and cell comparison/die comparison of the number as many as the number of defects are set into the memory table in the memory controller every defect. The whole controller 1109 sets the defective image head address and the extracting image size on the basis of the information derived from the defect discriminating unit 1107. As for the cell comparison and the die comparison, the whole controller 1109 sets either the cell comparison or the die comparison by collating the detected defect position with the information regarding the comparison system of the inspection image in each area. Which one of the chips before and after the inspection image should be used as a reference image is set into the reference image position information in the case of the die comparison. The cell pitch is set in the case of the cell comparison.

FIG. 21B is an explanatory diagram showing the relations between the inspection image and the reference image of a defect 5 and the inspection image and the reference image of a defect 6 which are extracted from the image memory 1105 by the memory controller 1104 on the basis of the information in the memory table shown in FIG. 21A. It is assumed here that the defect 5 is detected in the cell pitch A area and the defect 6 is detected in the die comparison area. In this case, the whole controller 1109 sets the cell pitch A as reference image position information into the memory table in the memory controller 1104 with respect to the defect 5 and sets a code showing the cell comparison with respect to the cell comparison/die comparison. With respect to the defect 6, a code showing, for example, the one-chip precedent is set as reference image position information and a code showing the die comparison is set with respect to the cell comparison/die comparison.

For the defect 5, the memory controller 1104 extracts the image, as an inspection image, of the size designated by the extracting image size from the defective image head address designated by the memory table from the image memory 1105. It also extracts the image, as a reference image, of the same size from the address which is precedent by the cell pitch A. The extracted inspection image and reference image are transferred to the defect analyzing unit 1108 from the memory controller 1104.

For the defect 6, the memory controller 1104 extracts the image, as an inspection image, of the size designated by the extracting image size from the defective image head address designated by the memory table from the image memory 1105. It also extracts the image, as a reference image, of the same size of the same address of the one-precedent chip. The extracted inspection image and reference image are transferred to the defect analyzing unit 1108 from the memory controller 1104.

Although it is necessary that the position information to read out the defective images, the relative position information of the reference image to the inspection image, the information indicative of either the cell comparison or the die comparison are set into the memory controller every detected defect, when the image is transferred from the image memory to the defect analyzing unit, a high speed is required. Therefore, if those information can be collected in a table so that they can be stored in a lump to a certain extent and such a table can be stored as memory information, the reading operation of the defective images from the memory can be sequentially executed. Further, if the defective image reading table is duplexed (double tables) so as to enable the information for reading out the next defective image to be set simultaneously with the operation to read out the defective image from the image memory, even in the case where a number of extraction defects occurred continuously, the data reading operation from the image memory and the transfer of the image data to the defect analyzing unit can be continually executed.

Figure 22A:
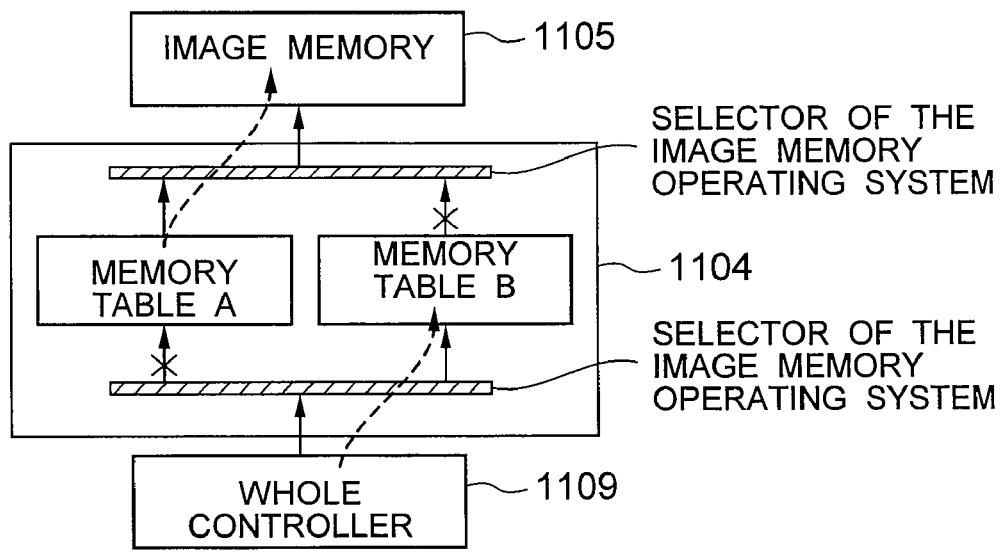
FIGS. 22A and 22B are explanatory diagrams showing an example in which a memory table is duplexed.
Figure 22B:
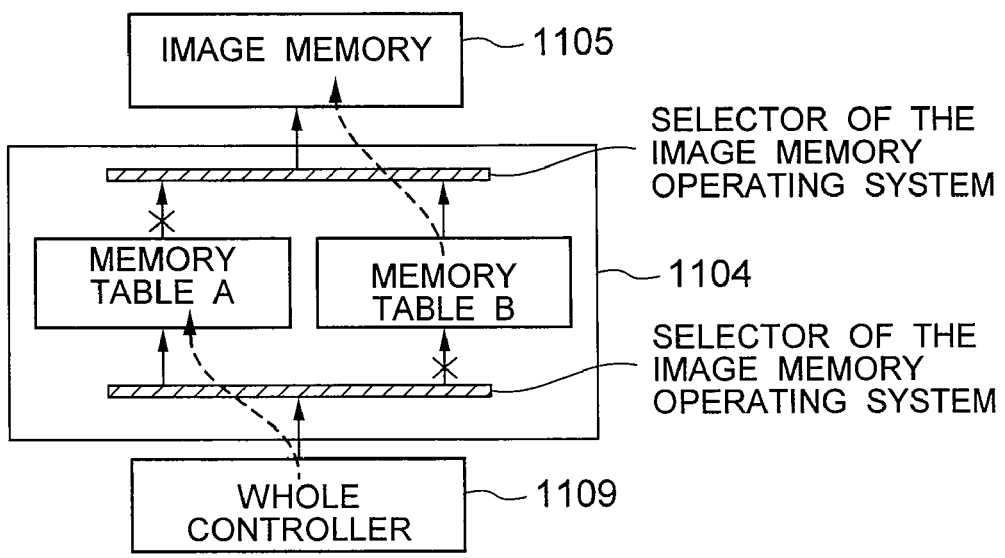

FIGS. 22A and 22B are explanatory diagrams showing an example in which the memory table is duplexed. FIG. 22A shows an example in which in the case where memory tables A and B in which a plurality of image extracting information can be set exist, while the memory table A is providing the information to extract the inspection image and the reference image from the image memory, the other memory table B receives the information from the whole controller 1109 in order to temporarily store the next extracting information. On the contrary to FIG. 22A, FIG. 22B shows an example in which while the memory table B is providing the information to extract the inspection image and the reference image from the image memory, the other memory table A receives the information from the whole controller 1109 in order to temporarily store the extracting information.

FIG. 23 shows the contents in the memory tables A and B. Each defect extracting information in the memory tables comprises the items shown in FIG. 19A, 20A, or 21A.

As for the data to form the inspection image and the reference image for the defect analysis, first, the data which has been set as extracting information of the defect No. 1 in the memory table A is used as information to read out the image data from the image memory by the memory controller. Subsequently, the processes to obtain the extracting information of the defect No. 2, the extracting information of the defect No. 2, and the like are similarly executed in this manner. After completion of the process to obtain the extracting information of the last defect No. n, the roles of the memory tables A and B are exchanged and the data for the defect analysis from the image memory is formed by using the extracting information of the defect No. (n+1) in the memory table B.

The third embodiment of the invention will now be described.

Figure 24:
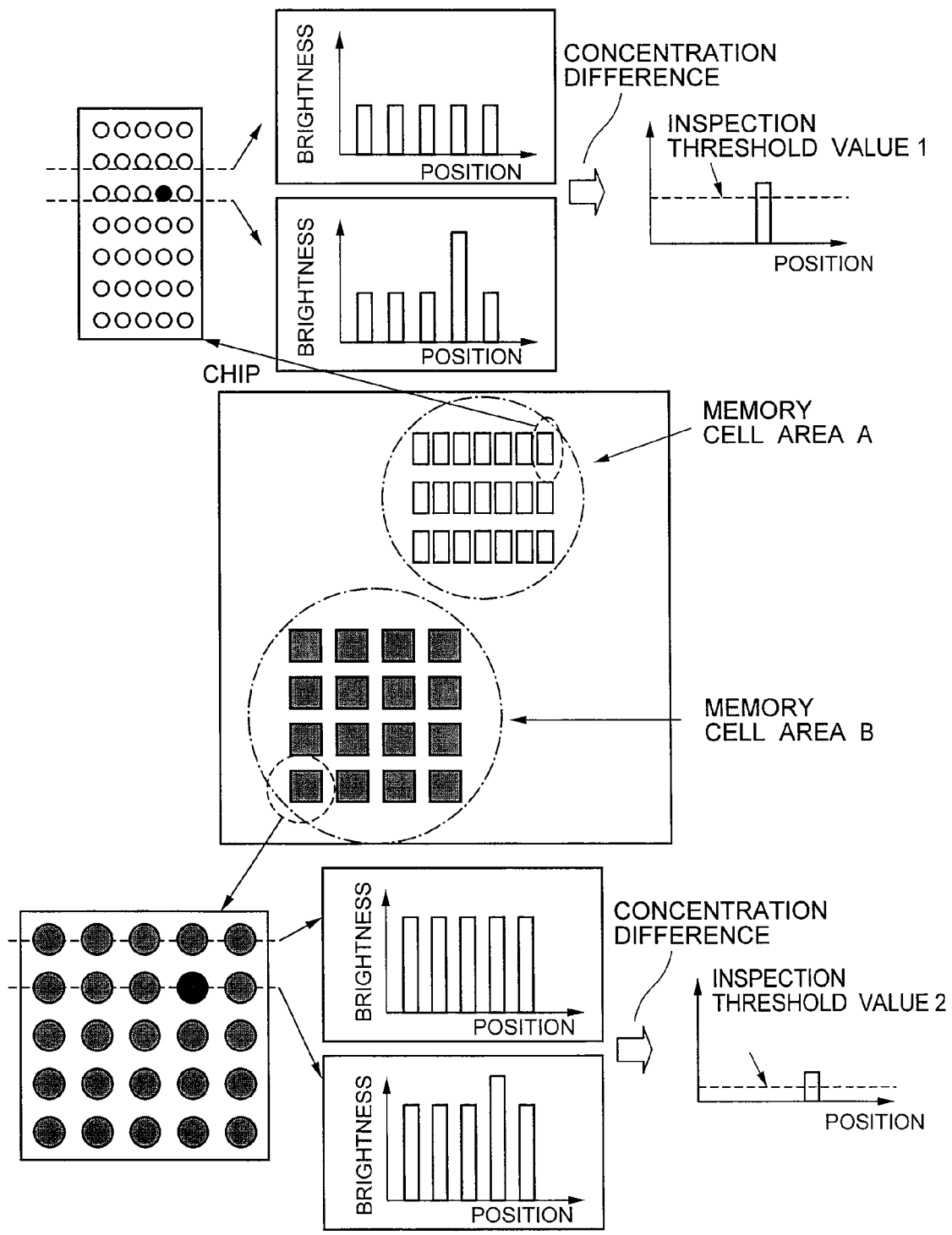
FIG. 24 is an explanatory diagram showing an inspection threshold value according to the invention.

The inspection threshold value will now be described with respect to the memory cell area as an example with reference to FIG. 24. As shown in FIG. 24, the same pattern is periodically repeated in the memory cell areas in the chip. The images are compared in accordance with such a repetitive period and the pattern in which the brightness, size, or the like of the image is equal to or larger than a specific value which is determined by the user designation or the like is determined to be a defect. Such a specific value as a comparing condition is called an inspection threshold value. There is a case where a plurality of memory cell areas of different cell pitches exist in the chip. In this case, since the degrees of the brightness of the memory cell areas differ, if the comparison inspection is executed by the inspection threshold value 1 in the memory cell area A and the comparison inspection is executed by the inspection threshold value 2 in the memory cell area B, defect detecting sensitivity is improved.

Figure 25:
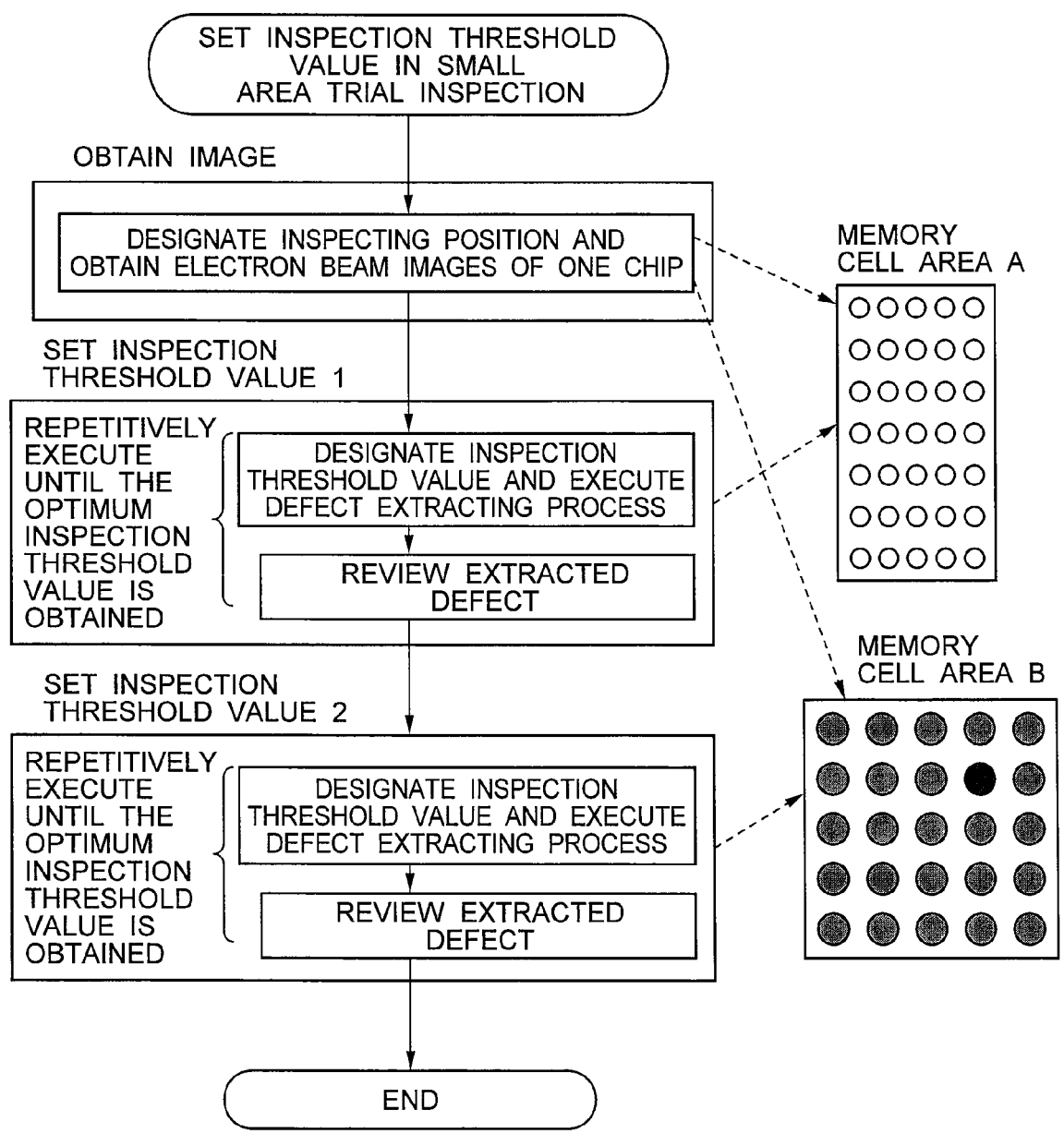
FIG. 25 is an explanatory diagram showing an inspection threshold value setting process according to the invention.

A method of setting the inspection threshold value by the small area trial inspection will be described with reference to FIG. 25. First, the inspecting position is designated and the electron beam image of one chip is obtained. Subsequently, the inspection threshold value for the memory cell area A is decided. The inspection threshold value is designated, the defect extracting process is executed, the obtained defect is reviewed, and it is confirmed that a desired defect has been obtained. If the desired defect is not obtained, the inspection threshold value is changed, the defect extracting process is executed, and the obtained defect is reviewed again. Those operations are repetitively executed until a desired result is obtained. The similar operations are executed to the cell area B.

Thus, the following recipe information is formed and stored.

Memory cell area A: inspection threshold value 1
Memory cell area B: inspection threshold value 2

Other inspection area information and cell comparison pitch which are necessary for the inspection are determined by the memory cell setting (S8 in FIG. 3) and the inspection are setting (S10 in FIG. 3).

The cell comparison inspecting operation will now be described with reference to FIGS. 26A to 26C. FIG. 26A is a whole constructional diagram of an inspection wafer. FIG. 26B is an enlarged specific diagram of the chip A. FIG. 26C is an enlarged specific diagram of the memory cell B.

As shown in FIGS. 26A to 26C, an attention is paid to the memory cell areas in the chip. As shown in FIG. 26C, the electron beam is irradiated in the X direction while moving the state in the Y-axial direction, thereby obtaining a one-dimensional image in the X direction. Images 1 and 2 which are continuously obtained are compared at the cell comparison pitch interval obtained before, thereby specifying the defect coordinates. The defect coordinates are sent to the whole control unit 49 from the defective data buffer 47.

The specific image comparing operation will now be described with reference to FIG. 27. First, image processes to realize the invention will be described. The arithmetic operating unit 48 converts the recipe information set by the whole control unit 49 into inspection information for the image processing circuit and it into the image processing circuit 46 (the positional deviation detecting unit, the defect discriminating unit, the defect analyzing unit). The one-dimensional image data which is continuously obtained while moving the stage is transferred to the image processing circuit through the storing means 45. While obtaining the image data from the storing means 45 in accordance with the inspection information, the image processing circuit 46 executes the cell comparing process and decides the defect coordinates and defective data. The decided defective data is accumulated in the defective data buffer.

The information of the inspection area includes the start/end coordinates, the cell comparison pitch, and the inspection threshold value of each memory cell inspection area. If two memory cell areas exist as shown in FIG. 24, the start/end coordinates, the cell comparison pitch, and the inspection threshold value of each memory cell inspection area of each of the memory cell areas A and B are sent to the arithmetic operating unit 48 from the whole control unit 49. Further, they are converted into inspection area information for the image processing circuit and sent to the positional deviation detecting unit and the defect discriminating unit. The comparison inspection of the image data which is sent from the storing means 45 is executed.

Figure 28:
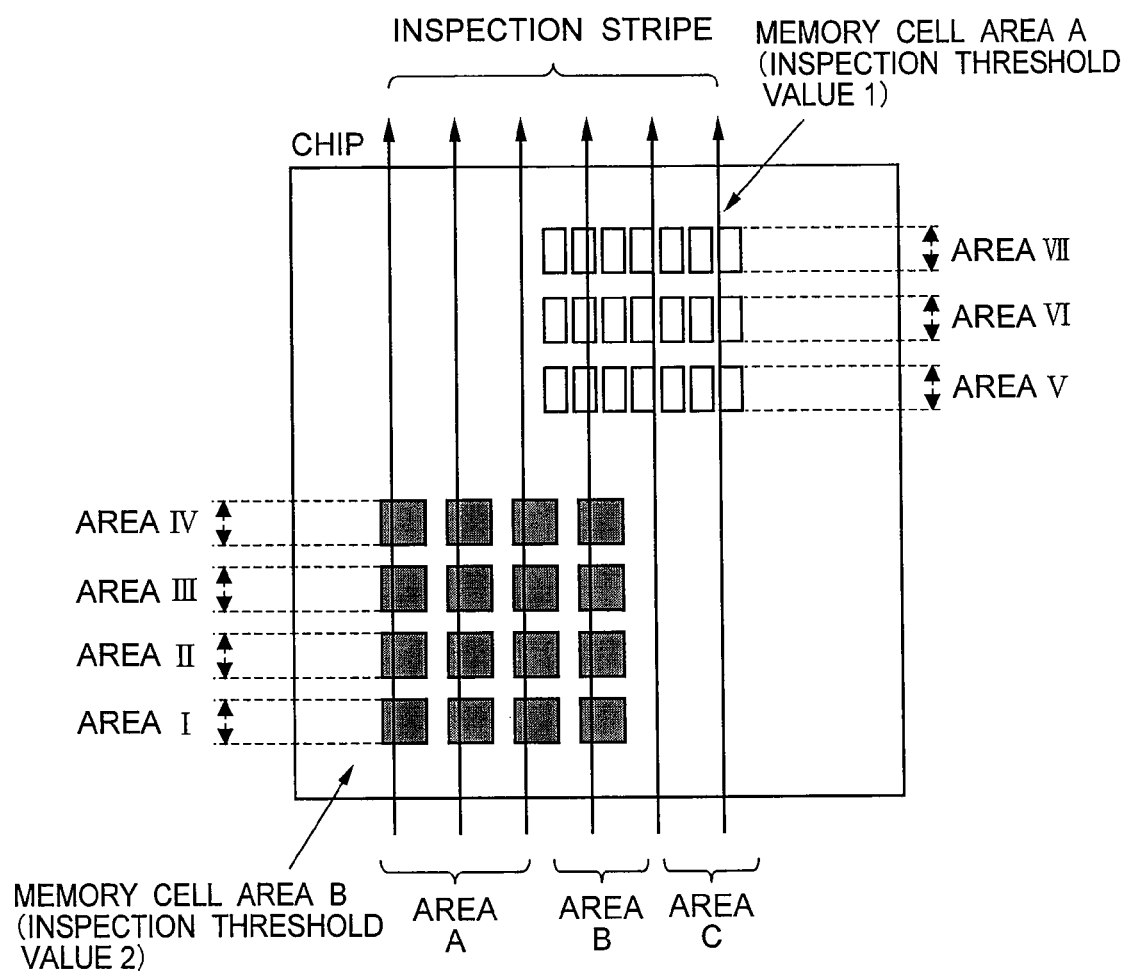
FIG. 28 is a diagram showing the plural-area inspecting operation according to the invention.

The cell comparison inspecting operation in the case where a plurality of memory cell areas overlap will be described with reference to FIG. 28. As shown in FIG. 28, in the case of executing stripe inspection in the chip, a combination of the cell comparison inspection areas differs for each of the areas A, B, and C as shown below.

Area A: cell comparison inspection areas I/II/III/IV
Area B: cell comparison inspection areas I/II/III/IV/V/VI/VII
Area C: cell comparison inspection areas V/VI/VII The cell comparison inspection areas of the different cell comparison pitches and the different inspection threshold values mixedly exist in the area B and the inspection area information is registered and stored into the recipe as follows.
Inspection Area Information

| Area I | (inspection start/end coordinates, cell comparison pitch 2, inspection threshold value 2) |
| Area II | (inspection start/end coordinates, cell comparison pitch 2, inspection threshold value 2) |
| Area III | (inspection start/end coordinates, cell comparison pitch 2, inspection threshold value 2) |
| Area IV | (inspection start/end coordinates, cell comparison pitch 2, inspection threshold value 2) |
| Area V | (inspection start/end coordinates, cell comparison pitch 1, inspection threshold value 1) |
| Area VI | (inspection start/end coordinates, cell comparison pitch 1, inspection threshold value 1) |
| Area VII | (inspection start/end coordinates, cell comparison pitch 1, inspection threshold value 1) |

The arithmetic operating unit 48 converts the recipe information which is set by the whole control unit 49 into inspection information for the image processing circuit and sets it into the image processing circuit 46 (the positional deviation detecting unit, the defect discriminating unit, the defect analyzing unit). Therefore, the image processing circuit 46 discriminates a difference of the inspection start coordinates, changes the cell comparison pitch and the inspection threshold value on the way of the stripe, and can execute the comparison inspection at the corresponding cell comparison pitch every cell comparison inspection area.

Figure 29:
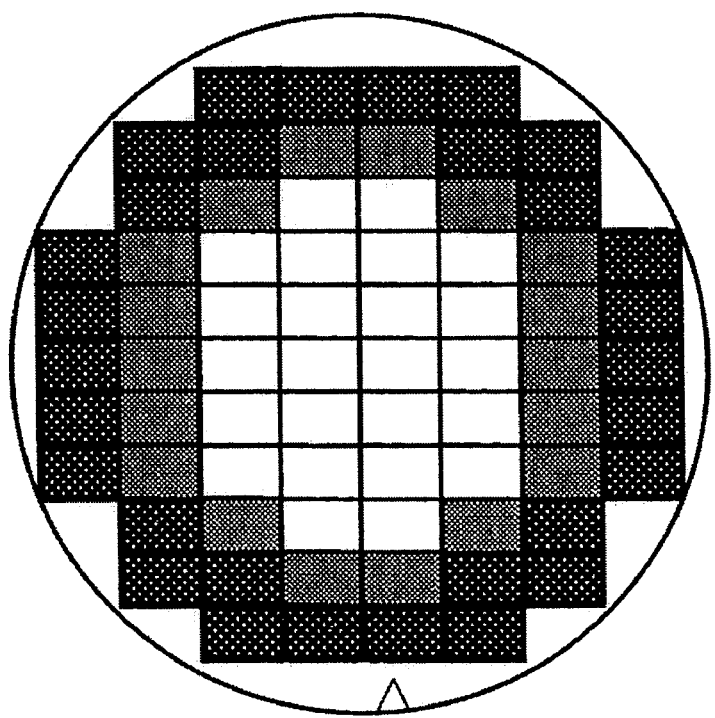
FIG. 29 is a diagram showing the inspecting operation by the inspection threshold value depending on a position on the wafer according to the invention.

The inspecting operation in the case of changing the inspection threshold value in dependence on the position on the wafer and inspecting will now be described with reference to FIG. 29.

Generally, there is a tendency that defects frequently occur in the outer periphery of the wafer as compared with the center portion. Since the defects frequently occur in the outer periphery of the wafer, a possibility that the attractive defect existing at the center of the wafer cannot be detected rises. Therefore, as shown in FIG. 29, the area including the chip existing in the outermost periphery of the wafer is labeled as an inspection area A, its inside labeled as an inspection area B, and the center portion of the wafer is labeled as an inspection area C. By setting the different inspection threshold value for each area, the defect detecting precision is improved.

Figure 27:
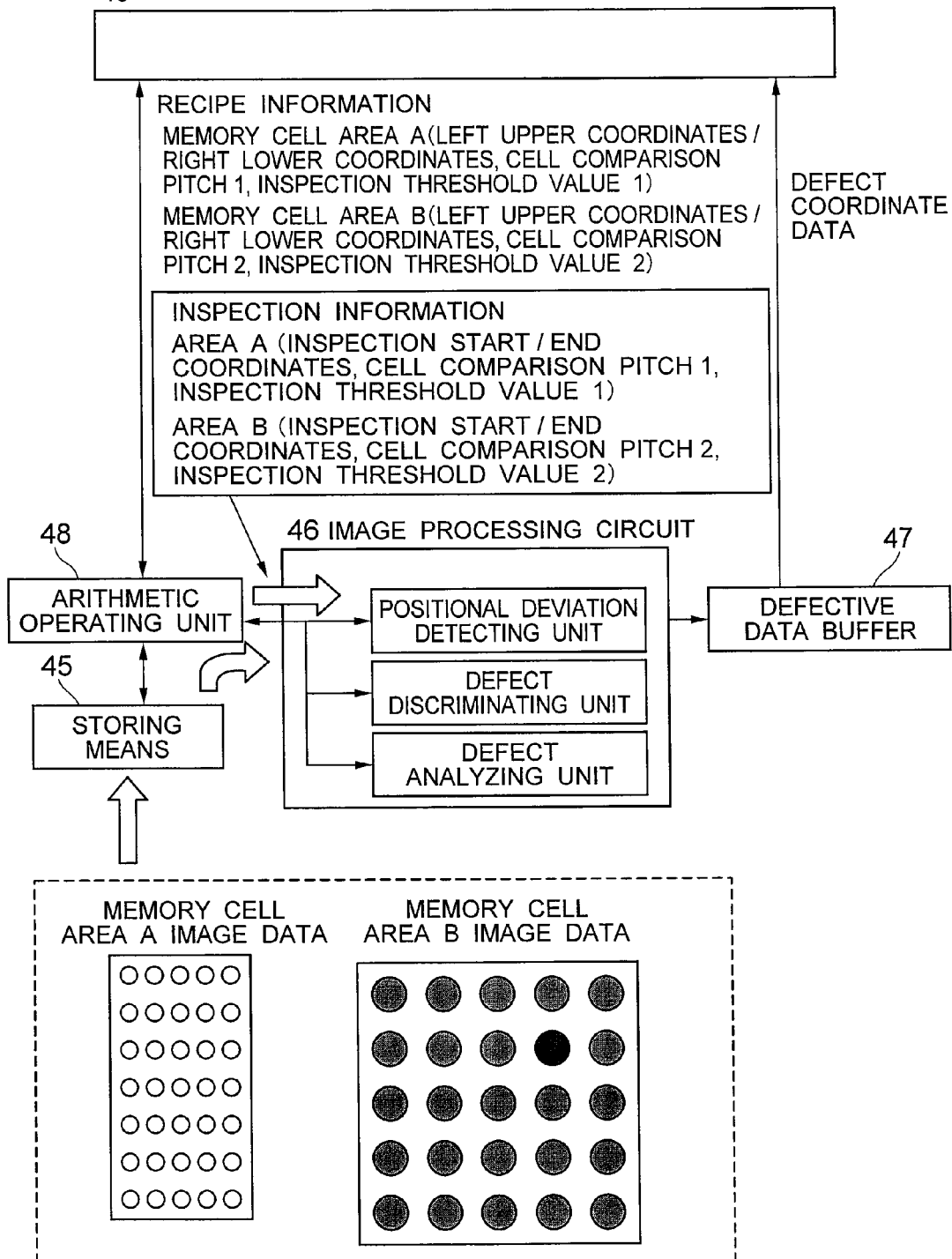
FIG. 27 is a diagram showing the image comparison processing operation according to the invention.

To realize the above construction, the following information is included in the recipe information which is sent to the arithmetic operating unit 48 from the whole control unit 49 shown in FIG. 27. There is no change in the inspection information from the arithmetic operating unit 48 to the image processing circuit 46.

Inspection area A:
chip number belonging to the inspection area A, inspection threshold value 1
Inspection area B:
chip number belonging to the inspection area B, inspection threshold value 2
Inspection area C:
chip number belonging to the inspection area C, inspection threshold value 3

As mentioned above, according to the embodiment, the inspecting method and inspection apparatus for inspecting the circuit patterns at the high defect detecting precision and high time efficiency can be provided by having the means for setting a plurality of inspection threshold values serving as defect discriminating conditions for a plurality of inspection areas and having the function of inspecting the plurality of inspection areas by the different inspection threshold values.

The invention claimed is:

1. A pattern inspection apparatus comprising:
an image memory for storing image data obtained by photographing a semiconductor wafer on which a plurality of chips are formed;
a memory controller for extracting image data from said image memory and transferring the image data;
a positional deviation detecting unit for calculating a positional deviation amount between images of two areas on the semiconductor wafer to be compared;
a defect discriminating unit for obtaining a differential image between the images of said two areas by using the positional deviation amount as a correction value and extracting defect candidates from the differential image;
a defect analyzing unit for analyzing the images extracted as the defect candidates; and
a control unit for controlling operation of the image memory, memory controller, positional deviation detecting unit, defect discriminating unit and defect analyzing unit, wherein
said control unit:
holds information to identify an obtaining method performed in each area in the chip as a cell comparison or a die comparison, sets either the cell comparison or the die comparison based on a position of said defect candidate and said information to identify the obtaining method, and outputs a head address of an inspection image in said image memory, an extracting image size, a reference image position information indicating a relative position between an area on the semiconductor wafer which contains the inspection image and an area on the semiconductor wafer which contains a reference image corresponding to the inspection image, and information to identify the cell comparison or the die comparison, to said memory controller, wherein said memory controller:

extracts said inspection image from the image data in said image memory by using the head address of said inspection image, extracts said reference image from the image data in said image memory by using the head address of said inspection image, said extracting image size, the reference image position information and the information to identify the cell comparison or the die comparison, and transfers the extracted inspection image and the reference image to said defect analyzing unit.

2. An apparatus according to claim 1, wherein said reference image position information includes the information to identify the cell comparison or the die comparison, a cell pitch in the case of the cell comparison, and relative position information of the chip in the case of the die comparison.

3. An apparatus according to claim 1, wherein said memory controller holds a memory table in which the head address of the inspection image and the corresponding reference image position information have been recorded for each defect.

* * * * *